United States Patent [19]
Kato

[11] Patent Number: 5,559,557
[45] Date of Patent: Sep. 24, 1996

[54] MOTION VIDEO CODING WITH ADAPTIVE PRECISION FOR DC COMPONENT COEFFICIENT QUANTIZATION AND VARIABLE LENGTH CODING

[75] Inventor: Motoki Kato, Kanagawa, Japan

[73] Assignee: Sony Corporation, Tokyo, Japan

[21] Appl. No.: 127,569

[22] Filed: Sep. 28, 1993

[30] Foreign Application Priority Data

Sep. 28, 1992 [JP] Japan .................................. 4-258200
Jul. 1, 1993 [JP] Japan .................................. 5-163433

[51] Int. Cl.$^6$ ..................................................... H04N 7/30
[52] U.S. Cl. ..................................................... 348/405
[58] Field of Search ................................. 348/405, 419,
348/420, 404, 403, 399, 396, 395, 393,
391, 390, 384, 397

[56] References Cited

U.S. PATENT DOCUMENTS

| | | | |
|---|---|---|---|
| 4,984,076 | 1/1991 | Watanabe et al. ...................... | 348/405 |
| 5,128,758 | 7/1992 | Azadegan et al. ...................... | 358/133 |
| 5,150,208 | 9/1992 | Otaka et al. ............................ | 348/420 |
| 5,157,488 | 10/1992 | Pennebaker .............................. | 348/404 |
| 5,198,900 | 3/1993 | Tsukagoshi .............................. | 348/384 |
| 5,309,231 | 5/1994 | Hamada et al. ......................... | 348/404 |
| 5,321,440 | 6/1994 | Yanagihara et al. ..................... | 348/408 |
| 5,335,016 | 8/1994 | Nakagawa ................................ | 348/405 |
| 5,337,049 | 8/1994 | Shimoda .................................. | 348/420 |
| 5,337,087 | 8/1994 | Mishima .................................. | 348/405 |
| 5,369,439 | 11/1994 | Matsuda et al. ......................... | 348/405 |
| 5,374,958 | 12/1994 | Yanagihara .............................. | 348/405 |
| 5,400,075 | 3/1995 | Savatier .................................. | 348/384 |
| 5,402,244 | 3/1995 | Kim ....................................... | 358/261.2 |

*Primary Examiner*—Tommy P. Chin
*Assistant Examiner*—Bryan S. Tung
*Attorney, Agent, or Firm*—William S. Frommer; Alvin Sinderbrand

[57] ABSTRACT

Direct current component coefficients resulting from an orthogonal transformation of a video signal are encoded with a precision, expressed in terms of quantization bits, which may be varied at each video sequence, group of pictures, picture, slice, macroblock or block portion of the video signal in accordance with a required picture quality. The encoded coefficients may be decoded in accordance with the precision used during encoding.

29 Claims, 24 Drawing Sheets

| F(0,0) | F(1,0) | F(2,0) | F(3,0) | F(4,0) | F(5,0) | F(6,0) | F(7,0) |
|--------|--------|--------|--------|--------|--------|--------|--------|
| F(0,1) | F(1,1) | F(2,1) | F(3,1) | F(4,1) | F(5,1) | F(6,1) | F(7,1) |
| F(0,2) | F(1,2) | F(2,2) | F(3,2) | F(4,2) | F(5,2) | F(6,2) | F(7,2) |
| F(0,3) | F(1,3) | F(2,3) | F(3,3) | F(4,3) | F(5,3) | F(6,3) | F(7,3) |
| F(0,4) | F(1,4) | F(2,4) | F(3,4) | F(4,4) | F(5,4) | F(6,4) | F(7,4) |
| F(0,5) | F(1,5) | F(2,5) | F(3,5) | F(4,5) | F(5,5) | F(6,5) | F(7,5) |
| F(0,6) | F(1,6) | F(2,6) | F(3,6) | F(4,6) | F(5,6) | F(6,6) | F(7,6) |
| F(0,7) | F(1,7) | F(2,7) | F(3,7) | F(4,7) | F(5,7) | F(6,7) | F(7,7) |
FIG.1

FIG.6A

| SIZE | Differential DC | Code |
|---|---|---|
| 0 | 0 | 0 |
| 1 | -1,1 | 1 |
| 2 | -3,-2 2,3 | 00,01 10,11 |
| 3 | -7,-6,-5,-4 4,5,6,7 | 000,001,010,011 100,101,110,111 |
| 4 | -15,-14,...,-9,-8 8,9,...,14,15 | 0000,0001,...,0111 1000,1001,...,1111 |
| 5 | -31,-30,...,-16,17 16,17,...,30,31 | 00000,00001,...,01111 10000,10001,...,11111 |
| 6 | -63,-62,...,-33,-32 32,33,...,62,63 | 000000,000001,...,011111 100000,100001,...,111111 |
| 7 | -127,-126,...,-65,-64 64,65,...,126,127 | 0000000,0000001,...,0111111 1000000,1000001,...,1111111 |
| 8 | -255,-254,...,-129,-128 128,129,...,254,255 | 00000000,00000001,...,01111111 10000000,10000001,...,11111111 |

FIG.6B

| VLC code | dct dc size luminance |
|---|---|
| 100 | 0 |
| 00 | 1 |
| 01 | 2 |
| 101 | 3 |
| 110 | 4 |
| 1110 | 5 |
| 11110 | 6 |
| 111110 | 7 |
| 1111110 | 8 |

FIG.6C

| VLC code | dct dc size chrominance |
|---|---|
| 00 | 0 |
| 01 | 1 |
| 10 | 2 |
| 110 | 3 |
| 1110 | 4 |
| 11110 | 5 |
| 111110 | 6 |
| 1111110 | 7 |
| 11111110 | 8 |

```
/*    VARIABLE LENGTH CODING OF DCT DC COMPONENT COEFFICIENTS    */ define MAX_SIZE    (no. of bits of precision needed for DC coeff)

vlc_dct_dc(value)

int value /* differentiated DC component coeff to be VLC encoded */
  {
  int sign=Sign(value);   /* the sign + or - of "value"   */
  int diff=abs(value);    /* the magnitude of "value"     */
  int size;
  int offset=0;
  int i;

for (size=MAX_SIZE; size>0; size--) {
    if (diff&( 1<<(size-1) )) break;
    }
  for (i=0;i<size;i++)
    offset += ( 1<<i );

if (sign==(-1))
    diff=offset-diff;

/* produce a variable-length value for "size" from
   the tables according to the present invention */ if(isY_block)
 vlc_dct_dc_size_luminance(size);
else
 vlc_dct_dc_size_chrominance(size);

/* the encoded differentiated DC component coefficient "diff"
   is output by calling a function uimsbf, unsigned integer
   most significant bit first, with the number of bits
   given by "size" */ put_uimsbf(diff,size);
}
```

| SIZE | Differential DC | Code |
|---|---|---|
| 0 | 0 | 0 |
| 1 | -1 1 | 1 |
| 2 | -3,-2 2,3 | 00,01 10,11 |
| 3 | -7,-6,-5,-4 4,5,6,7 | 000,001,010,011 100,101,110,111 |
| 4 | -15,...,-9,-8 8,9,...,14,15 | 0000,0001,...,0111 1000,1001,...,1111 |
| 5 | -31,-30,...,-16,17 16,17,...,30,31 | 00000,00001,...,01111 10000,10001,...,11111 |
| 6 | -63,-62,...,-33,-32 32,33,...,62,63 | 000000,000001,...,011111 100000,100001,...,111111 |
| 7 | -127,-126,...,-65,-64 64,65,...,126,127 | 0000000,0000001,...,0111111 1000000,1000001,...,1111111 |
| 8 | -255,-254,...,-129,-128 128,129,...,254,255 | 00000000,00000001,...,01111111 10000000,10000001,...,11111111 |
| 9 | -511,-510,...,-257,-256 256,257,...,510,511 | 000000000,......, 01111111111 100000000,......, 111111111 |
| 10 | -1023,-1022,......,-512 512,......,1022,1023 | 0000000000,......, 0111111111 1000000000,......, 1111111111 |
| 11 | -2047,-2046,......,-1024 1024,......,2046,2047 | 00000000000,......, 01111111111 10000000000,......, 11111111111 |

FIG.9B

| VLC code | dct dc size luminance |
|---|---|
| 100 | 0 |
| 00 | 1 |
| 01 | 2 |
| 101 | 3 |
| 110 | 4 |
| 1110 | 5 |
| 11110 | 6 |
| 111110 | 7 |
| 1111110 | 8 |
| 11111110 | 9 |
| 111111110 | 10 |
| 111111111110 | 11 |

FIG.9C

| VLC code | dct dc size chrominance |
|---|---|
| 00 | 0 |
| 01 | 1 |
| 10 | 2 |
| 110 | 3 |
| 1110 | 4 |
| 11110 | 5 |
| 111110 | 6 |
| 1111110 | 7 |
| 11111110 | 8 |
| 111111110 | 9 |
| 1111111110 | 10 |
| 11111111110 | 11 |

```
pictuer0 {
  picture_start_code                                            32    bslbf
  tempoeal_reference                                            10    uimsbf
  if(sscalable) {
    lower_picture_reference                                     10    uimsbf
  }
  picture_coding_type                                            3    uimsbf
  vbv_delay                                                     16    uimsbf
  if(picture_coding_type==2 || picture_coding_type ==3) {
    full_pel_forward_vector                                      1
    forward_f_code                                               3    uimsbf
  }
  if(picture_coding_type==3) {
    full_pel_backward_vector                                     1
    backward_f_code                                              3    uimsbf
  }
  while(nextbits()=='1') {
    extra_bit_picture                                            1    "1"
    extra_information_picture                                    8
  }
  extra_bit_picture                                              1    "0"
  next_start_code()
  if(nextbits()==extension_start_code) {
    extension_start_code                                        32    bslbf
    if(picture_coding_type==2 || picture_coding_type==3) {
      forward_vertical_f_code                                    3    uimsbf
    }
    if(picture_coding_type==3) {
      backward_vertical_f_code                                   3    uimsbf
    }
    picture_structure                                            2    uimsbf
    interlace_progressive_flag                                   2    uimsbf
    if(picture_structure=='frame_picture'&&
        interlace_progressive_flag=='interlace') {
      top_field_first_flag                                       1    uimsbf
      number_of_fields_displayed_code                            3    uimsbf
    }
    forward_reference_fields                                     2    uimsbf
    backward_reference_fields                                    2    uimsbf
    if(chroma_format=="01") { /*4:2:0*/
      chroma_postprocessing_type                                 1    uimsbf
    } else {
      reserved                                                   1    uimsbf
    }
```

FIG.10A

```
        if(video_format ! ='000')  |/*composite input*/
           v-axis                                                1        uimsbf
           field_sequence                                        3        uimsbf
           sub_carrier                                           1        uimsbf
           burst_amplitude                                       7        uimsbf
           sub_carrier_phase                                     8        uimsbf
        }
        for(i=0;i<number_of_fields_displayed;i++) {
          pan_horizontal_left_upper_offset                      16 maybe subpe uimsbf
                                                                required pan_vertical_left_upper_offset                        16 maybe subpe uimsbf
                                                                required
        }
        if(sscalable || fscalable) {
           overlap_horizontal_left_upper_offset                 17       simsbf
           overlap_vertical_left_upper_offset                   17       simsbf
           if(interlaced && picture_structure==frame_structure) {
              overlap_horizontal_left_upper_offset              17       simsbf
              overlap_vertical_left_upper_offset                17       simsbf
           }
        }
   ✱ intra_dc_precision                                         2        uimsbf
        qscale_type                                             1        uimsbf
        reserved  /*byte align */                               ?
        while(nextbits()!='0000 0000 0000 0000 0000 0001') {
             picture_extension_data                             8
        }
        next_start_code()
     }
     if(nextbits()==user_data_start_code) {
        user_data_start_code                                   32        bslbf
        while(nextbits()!='0000 0000 0000 0000 0000 0001') {
           user_data                                            8
        }
        next_start_code()
     }
     if(picture_coding_type!=5) {
       do {
          slice()
             }
          }
       } while(nextbits()==slice_start_code)
     }
   }
}
```

FIG.10B

```
/*    VARIABLE LENGTH DECODING OF DC COMPONENT COEFFICIENTS    */ ivlc_dct_dc(value)
{
  int dct_dc_size;  /* size is the number of quantization bits  */
  int dct_dc_diff;  /* differentiated DC component coefficient  */

/* produce a variable-length value for "size" from
   the tables according to the present invention */ if(isY_block) {
 dct_dc_size=ivlc_dct_dc_size_luminance();
}
else
 dct_dc_size=ivlc_dct_dc_size_chrominance();

/* the differentiated value of a DC component coefficient is
   decoded using the same processing for luminance and
   chrominance coefficients.
   the unsigned integer most significant bit first, having a
   bit count equal to the value of dct_dc_size is read into
   dct_dc_diff. */ if (dct_dc_size!=0) {
   dct_dc_diff=ivlc_dct_dc_diff(dct_dc_size);

/* and then dct_dc_diff is decoded */ if ((dct_dc_diff&(1<<(dct_dc_size-1)))==0)
     dct_dc_diff=(-1<<dct_dc_size) | (dct_dc_diff+1);
   }
  else {
    dct_dc_diff=0;
  }
}
```

FIG.12

| VLC code | dct dc size luminance |
|---|---|
| 100 | 0 |
| 00 | 1 |
| 01 | 2 |
| 101 | 3 |
| 110 | 4 |
| 1110 | 5 |
| 11110 | 6 |
| 111110 | 7 |
| 1111110 | 8 |
| 11111110 | 9 |
| 111111110 | 10 |
| 1111111110 | 11 |
| 11111111110 | 12 |
| 111111111110 | 13 |
| ... | ... |
| 11...1$_{M-2}$0 | M |

FIG. 21A

| VLC code | dct dc size chrominance |
|---|---|
| 00 | 0 |
| 01 | 1 |
| 10 | 2 |
| 110 | 3 |
| 1110 | 4 |
| 11110 | 5 |
| 111110 | 6 |
| 1111110 | 7 |
| 11111110 | 8 |
| 111111110 | 9 |
| 1111111110 | 10 |
| 11111111110 | 11 |
| 111111111110 | 12 |
| 1111111111110 | 13 |
| ... | ... |
| 11...1$_{M-1}$0 | M |

FIG. 21B

MOTION VIDEO CODING WITH ADAPTIVE PRECISION FOR DC COMPONENT COEFFICIENT QUANTIZATION AND VARIABLE LENGTH CODING

BACKGROUND OF THE INVENTION

The present invention relates to video signal encoding and decoding, and, more particularly, is directed to high precision encoding and decoding of orthogonally transformed coefficients with efficient compression.

Recently, orthogonal transformation techniques have been used to encode a video signal. One such orthogonal transformation is a discrete cosine transformation (DCT). In a two-dimensional DCT, pictures or images represented in the video signal are divided into blocks having a predetermined pixel count, and then each block is orthogonally transformed into a block of coefficients.

FIG. 1 shows a two-dimensional block of DCT coefficients corresponding to an image block of 8 pixels×8 lines. The coefficient F(0,0) corresponds to a direct-current component representing an average luminance value of the two-dimensional block.

Row coefficients such as F(1,0), F(2,0) ... F(6,0), F(7,0), and similarly F(1,1), F(2,1) ... F(6,1), F(7,1), represent high-frequency components in the vertical direction of the two-dimensional block. Column coefficients such as F(0,1), F(0,2) ... F(0,6), F(0,7), and similarly F(1,1), F(1,2) ... F(1,6), F(1,7), represent high-frequency components in the horizontal direction of the two-dimensional block.

The DCT encoding technique utilizes the two-dimensional correlation within an image to concentrate encoded signal power around a specific frequency component. The amount of information needed to represent the image can be compressed significantly if only coefficients distributed in this concentration are encoded.

For example, in the case of a flat picture, its blocks exhibit good autocorrelation, that is, amplitude levels of the pixels in the block are almost equal to each other. Therefore, DCT coefficients corresponding to the low-frequency components in the block, such as F(0,0), F(1,0), F(0,1), F(1,1), have large values while most of the other coefficients have very low or zero values. Accordingly, Huffman encoding, which compacts series of contiguous identical coefficients, significantly compresses the amount of information needed to represent the image.

A standard for encoding video signals with motion, popularly known as MPEG1, has been defined by ISO-IEC/JTC1/SC2/WG11. In the MPEG1 technique, a picture is either an "intra picture", meaning that it is encoded as a standalone picture, or an "inter picture", meaning that it is predictively encoded relative to at least one other picture.

The structure used for representing a video signal in MPEG1 format will now be explained with reference to FIG. 2.

As shown in FIG. 2, a block layer comprises luminance and chrominance blocks having 8 lines×8 pixels.

A macroblock layer comprises the luminance and chrominance blocks grouped into macroblocks (MB), that is, four luminance blocks Y0, Y1, Y2, Y3, and two chrominance blocks Cb and Cr, at the same spatial position of a picture as the luminance blocks. The six blocks in each macroblock are transmitted in the following sequence: Y0, Y1, Y2, Y3, Cb, Cr. Decisions as to what prediction data is to be used and whether or not a prediction error is to be transmitted are made for each of these block units.

A slice comprises a single macroblock or a plurality of macroblocks appearing in the scanning direction of the picture. At the head of a slice, differential values of direct-current component coefficients and motion vectors in the picture are reset. The first macroblock includes data indicating a position in the picture so as to allow for recovery in the event of an error. Accordingly, a slice can have any arbitrary length and start position which can be changed if an error occurs during transmission.

A picture layer comprises frames or fields of an image. A picture includes at least one slice. Each picture is an I (intra field), P (predictive), B (bidirectional) or D picture, depending on the technique used to encode it. An I picture is encoded relative to itself, that is, without motion compensation relative to a previously encoded picture. A P picture is encoded with forward-prediction relative to a previously encoded I or P picture which temporally precedes the P picture being encoded. A B picture is encoded with bidirectional-prediction relative to two previously encoded I or P pictures, which temporally precede and succeed the B picture.

A group of pictures (GOP) layer includes at least one I picture, and may also have at least one non-I picture.

A video sequence layer includes at least one GOP.

The MPEG1 standard defines different techniques for encoding the direct-current (DC) and alternating-current (AC) component coefficients of a two-dimensional DCT coefficient block. Representative MPEG1 techniques for encoding and decoding two-dimensional DCT DC component coefficients in an intra picture encoding process will now be described.

FIG. 3A shows an encoding apparatus comprising a DCT circuit 2, a quantizer 3, a differentiator 4 and a variable length coding (VLC) circuit 5. An input picture 1 is supplied to a DCT circuit 2 as blocks of 8 pixels×8 lines. The DCT circuit 2 is adapted to orthogonally transform each block of 8 pixels×8 lines into a block of DCT coefficients (e1) which is applied to a quantizer 3 that linearly quantizes the DC component coefficient of each block using a predetermined quantization step width having, in the case of MPEG1, a value of 8 to produce quantized DC component coefficients (e2). In the linear-quantization process, fractions of 0.5 and over are rounded up, while fractions less than 0.5 are disregarded.

The quantized DC component coefficients (e2) are supplied to a differentiator 4 which is adapted to differentiate blocks adjacent to each other, using different techniques for a luminance (Y) block and corresponding two chrominance (Cb and Cr) blocks, to produce differentiated coefficients (e3).

FIG. 4A shows a block diagram of the differentiator 4. An input is applied to a delay and a subtractor. The subtractor subtracts the delayed input from the current input and outputs the result as a differentiated signal.

FIG. 5A shows a differentiation technique for luminance blocks. A DC component coefficient of a luminance block is differentiated from direct-current component coefficients of right, left, upper and lower adjacent blocks in a zigzag order and the differentiated result replaces the DC component coefficient in the respective luminance coefficient blocks.

FIG. 5B shows a differentiation technique for chrominance blocks. DC component coefficients of right and left blocks adjacent to each other are differentiated and the result replaces the original DC component coefficient in the respective chrominance coefficient blocks.

Since a first block, that is, a first block of an I picture or a first block of a slice, cannot be differentiated, a predetermined number is used as an initial value in the delay element of the differentiator 4. In the case of the MPEG1 standard, a value of 128 is used as the initial value.

The differentiated coefficients (e3) are applied to a VLC circuit 5 of FIG. 3A which functions to encode the coefficients using a variable length code to produce an encoded video signal (6).

The VLC circuit 5 uses the differential DC component coefficient value to obtain a corresponding size value, that is, number of bits that will be used to encode the differential DC component coefficient, from a table shown as FIG. 6A. For example, a differential DC component coefficient (e3) with a value of +5 corresponds to a size of 3 bits.

Next, the VLC circuit 5 encodes the size value using, for luminance blocks, a table shown as FIG. 6B, and for chrominance blocks, a table shown as FIG. 6C. Continuing with the example, a size of 3 bits is encoded as 101, for a luminance block, or 110, for a chrominance block.

Then, the VLC circuit 5 encodes the differential DC component coefficient using a fixed-length code from the table shown in FIG. 6A. The fixed length code has a unique code value for each unencoded value. In the example, a differential DC component coefficient (e3) with a value of +5 corresponds to a fixed-length encoded value of 101.

Finally, the encoded differential DC component coefficient value is the result of concatenating the variable-length code representing the number of bits that are used to represent the differential DC component coefficient and the fixed-length code representing the differential DC component coefficient. In the example, for a luminance block, the encoded differential DC component coefficient value is 101101, and for a chrominance block, the encoded value is 110101.

FIG. 3B shows a decoding apparatus comprising a variable length decoding circuit 8, an inverse differentiator 9, an inverse quantizer 10 and an inverse DCT circuit 11. These elements operate in a complementary manner to the corresponding elements shown in FIG. 2A. FIG. 4B shows a block diagram of the inverse differentiator 9.

A problem with the encoding tables defined in the MPEG1 standard is that they do not necessarily cover all coefficient values.

To be more specific, in the one-dimensional DCT processing, an output resulting from the DCT processing is about $2\sqrt{2}$ times the value prior to the processing. In an intra picture encoding process using the MPEG1 technique, a pixel value of an input picture is in the range 0 to 255 or a number comprising 8 bits. Accordingly, the direct-current component coefficient of a two-dimensional DCT transformation coefficient is in the range 0 to 2047 or a number comprising 11 bits. The range 0 to 2047 is approximately 8 ($=2\sqrt{2}\cdot 2\sqrt{2}$) times the range 0 to 255.

In the MPEG1 technique, a value with this 11-bit precision always undergoes a linear quantization process for transformation into an 8-bit number in the range 0 to 255, thus reducing its precision to 8 bits, and is then differentiated. Accordingly, the table shown as FIG. 6A provides numbers in the range −255 to +255. That is, a fixed encoding precision of 8 bits for DCT DC component coefficients reduces the quality of a high grade picture encoded with the MPEG1 technique.

For an input picture having an eight-bit precision, simply enhancing the encoding precision of the DCT DC component coefficients from the conventional eight bits to a higher precision such as eleven bits results in inefficient encoding in some cases. To be more specific, if an encoding technique with a precision of, for example, eleven bits, is applied to a poor-gradation picture-quality requirement which can be satisfied adequately using an eight-bit precision, unnecessary codes are inevitably output.

Thus, known encoding techniques for a high quality video signal either degrade the picture or result in inefficient compression of the encoded picture.

OBJECTS AND SUMMARY OF THE INVENTION

Therefore, an object of the present invention is to provide a method and apparatus for encoding and decoding a video signal which avoids the aforementioned disadvantages of the prior art.

Another object of the present invention is to encode the direct current component coefficients representing a video signal with a larger number of bits than the number of bits used to represent each pixel in the video signal.

Still another object of the present invention is to adapt the encoding and decoding precision of the DC component coefficients of a picture to a required quality.

Yet another object of the present invention is to 14 variable length encode and decode the DC component coefficients of a picture using tables each having a length that depends on the required encoding and decoding precision, respectively.

In accordance with an aspect of the present invention, an encoding method for a video signal comprises the steps of receiving a picture quality signal and selecting an encoding precision in accordance with the picture quality signal. The video signal is orthogonally transformed to produce direct current component coefficients, and the direct current component coefficients are quantized using the selected encoding precision.

The picture quality signal corresponds to a video sequence, group of pictures, picture, slice, macroblock or block portion of the video signal.

The quantized direct current component coefficients are variable length encoded using variable length coding tables which each have a length that is a function of the selected encoding precision. Thus, the ranges of the tables can be dynamically adapted to the encoding precision required for the portion of the video signal being encoded.

In accordance with another aspect of the present invention, a decoding method for an encoded video signal comprises the steps of receiving a picture quality signal and selecting a decoding precision in accordance with the picture quality signal. Encoded direct current component coefficients are extracted from the encoded video signal and are inverse quantized using the selected decoding precision.

The picture quality signal corresponds to a video sequence, group of pictures, picture, slice, macroblock or block portion of the encoded video signal.

The encoded direct current component coefficients are variable length decoded using variable length coding tables which each have a length that is a function of the selected encoding precision.

Since the picture quality signal can be placed in the encoded video signal, the encoding and decoding precision used for direct current component coefficients can be changed together.

The above, and other objects, features and advantages of the present invention will be apparent in the following detailed description of the preferred embodiments of the present invention when read in conjunction with the accompanying drawings in which corresponding parts are identified by the same reference numeral.

BRIEF DESCRIPTION OF THE DRAWINGS

FIG. 1 is a diagram used for explaining properties of two-dimensional DCT coefficients;

FIGS. 6A–6C are tables used in encoding and decoding DC component coefficients;

FIG. 8 is a source program which may be used in a variable length encoder according to the present invention;

FIGS. 9A–9C are tables used in encoding and decoding DC component coefficients according to the present invention;

FIGS. 10A and 10B are charts illustrating a picture header which includes an intra_dc_precision code field;

FIG. 12 is a source program which may be used in a variable length decoder according to the present invention;

FIGS. 21A and 21B are tables which may be used in encoding and decoding DC component coefficients according to the present invention;

DETAILED DESCRIPTION OF THE PREFERRED EMBODIMENTS

With an encoder according the present invention, it is possible to adaptively modify the technique for encoding direct-current component coefficients as a function of the required picture quality. That is, the number of quantization bits used for encoding DCT DC component coefficients can be increased with an increase in required picture quality.

It is also possible to adapt the length of the variable length code tables for the direct-current component coefficients in accordance with a change in the precision needed for DCT DC component coefficients during encoding, that is, to increase the length of the tables being used or to decrease the length of the tables being used. Accordingly, the encoding process can be carried out with a high degree of efficiency.

In addition, with a decoder according to the present invention, it is possible to adaptively modify the technique for decoding incoming DCT DC component coefficients.

Furthermore, using the extended variable-length code table for the direct-current component coefficients in accordance with the precision, in quantization bits, needed for the DC component coefficients enables decoding of these coefficients with a high degree of efficiency.

Before the encoding commences, a raw picture to be encoded is evaluated based on the required picture quality. The properties to be evaluated include the quality of the raw picture and the degree of movement of the motion video picture. Based on the evaluation data and the required picture quality, the required precision for orthogonally transformed (DCT) DC component coefficients is then determined. Each sequence, GOP, picture, slice, macroblock or block may be evaluated to adaptively determine the required precision of the DC coefficients.

For example, if the evaluation data indicates that the raw picture does not have good quality, a precision of eight bits for the DC component coefficients will be adequate. For a motion video picture with fast movement, a precision of eight bits for the DC coefficients will also be adequate since human vision has low luminance discriminating power.

In another example, in the case of DCT DC component coefficients with a value in the range 0 to 2047, for example, it is necessary to specify a transmission precision of eleven bits for the coefficients in order to implement lossless coding desired for the demanded picture quality. The range 0 to 2047 is a maximum range of an output from a DCT module of an MPEG system for an input picture signal having a precision of eight bits.

To initially specify the precision of the coefficients or to modify the precision in the course of processing, it is necessary to set a flag and then transmit information on the precision of the coefficients in use.

Figure 2:
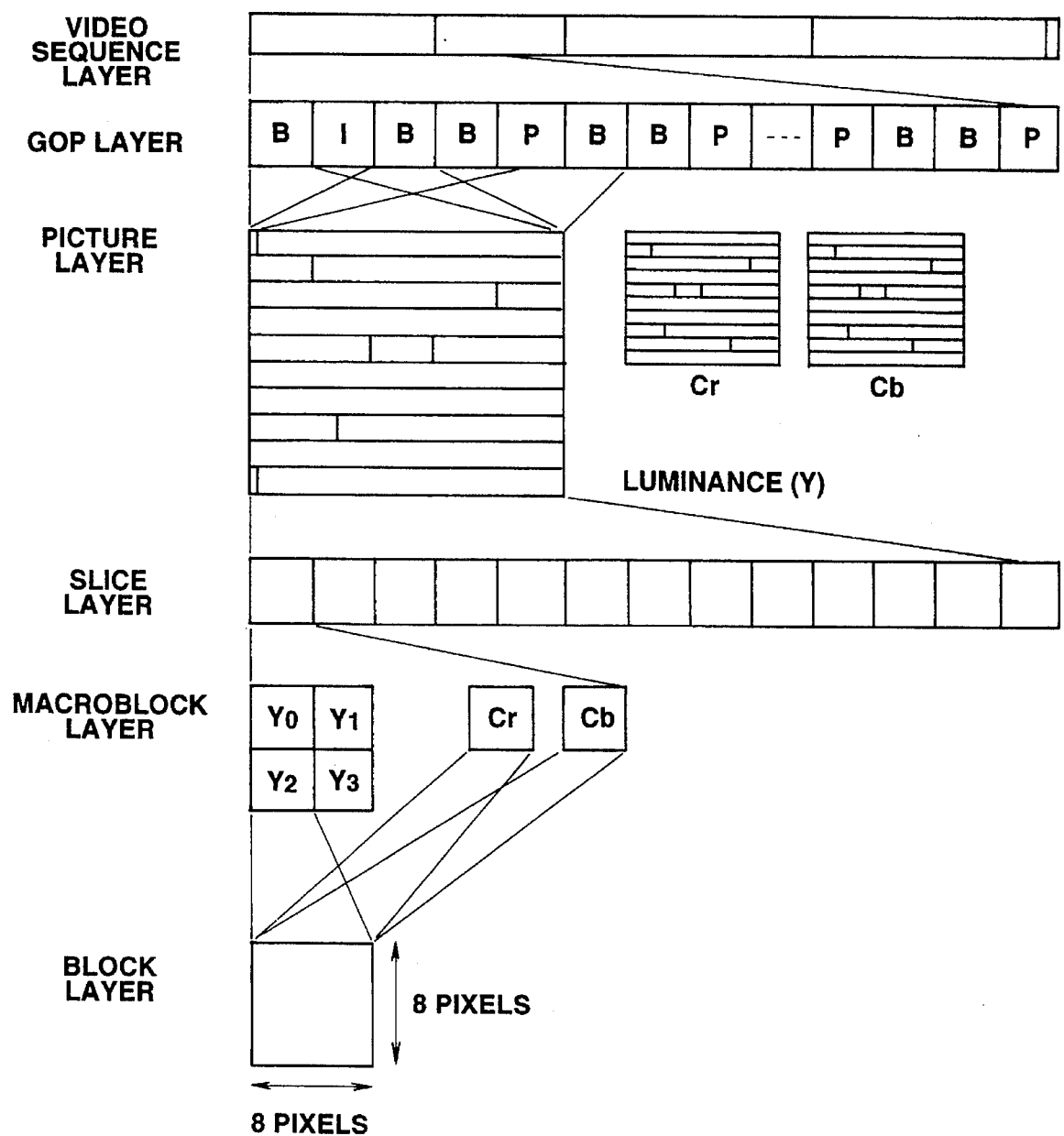
FIG. 2 is a diagram used in explaining the conceptual encoding levels according to the MPEG standard.
Figure 3A:
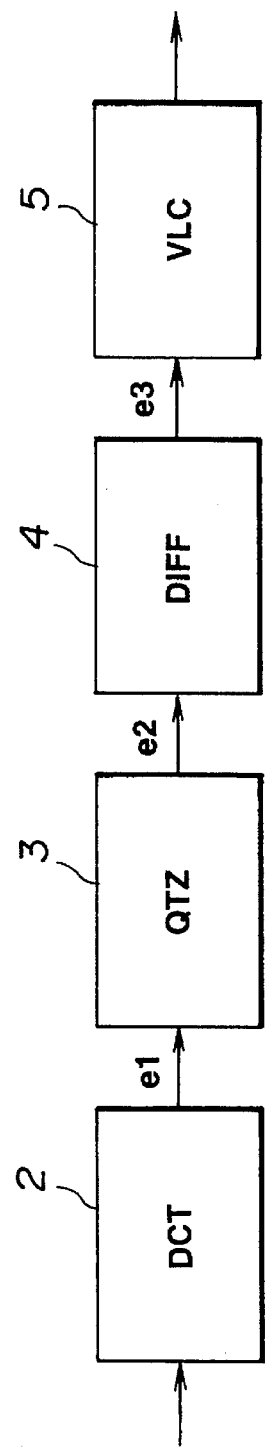
FIGS. 3A and 3B are block diagrams used in explaining video encoding and decoding processes, respectively.
Figure 3B:
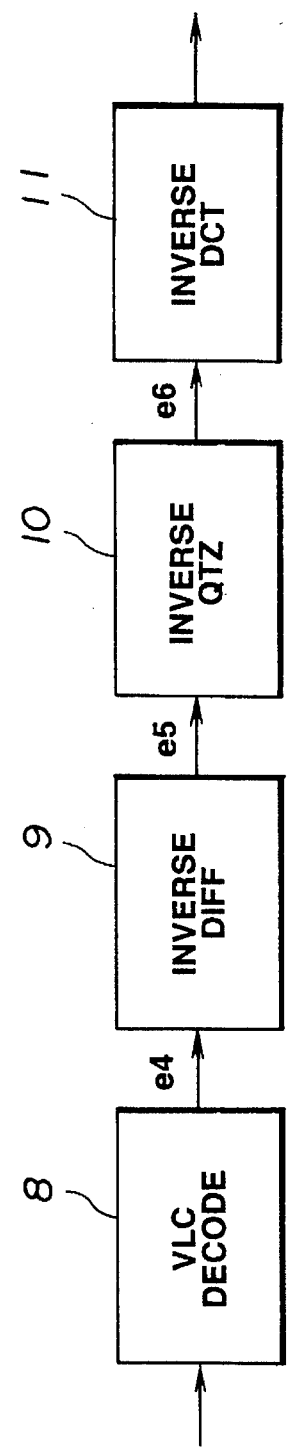

Encoding and decoding of DCT direct current component coefficients for a video signal generally according to the MPEG1 standard shown in FIG. 2, with a precision which may be varied for portions of the video signal, are described below. The present invention may also be applied to encoding and decoding of video signals in formats other than the MPEG1 format.

The following description is for a video signal having pixels represented with a precision of eight bits, and it will be appreciated that the present invention may also be applied to a video signal having pixels represented with a precision of more or less than eight bits.

Figure 7:
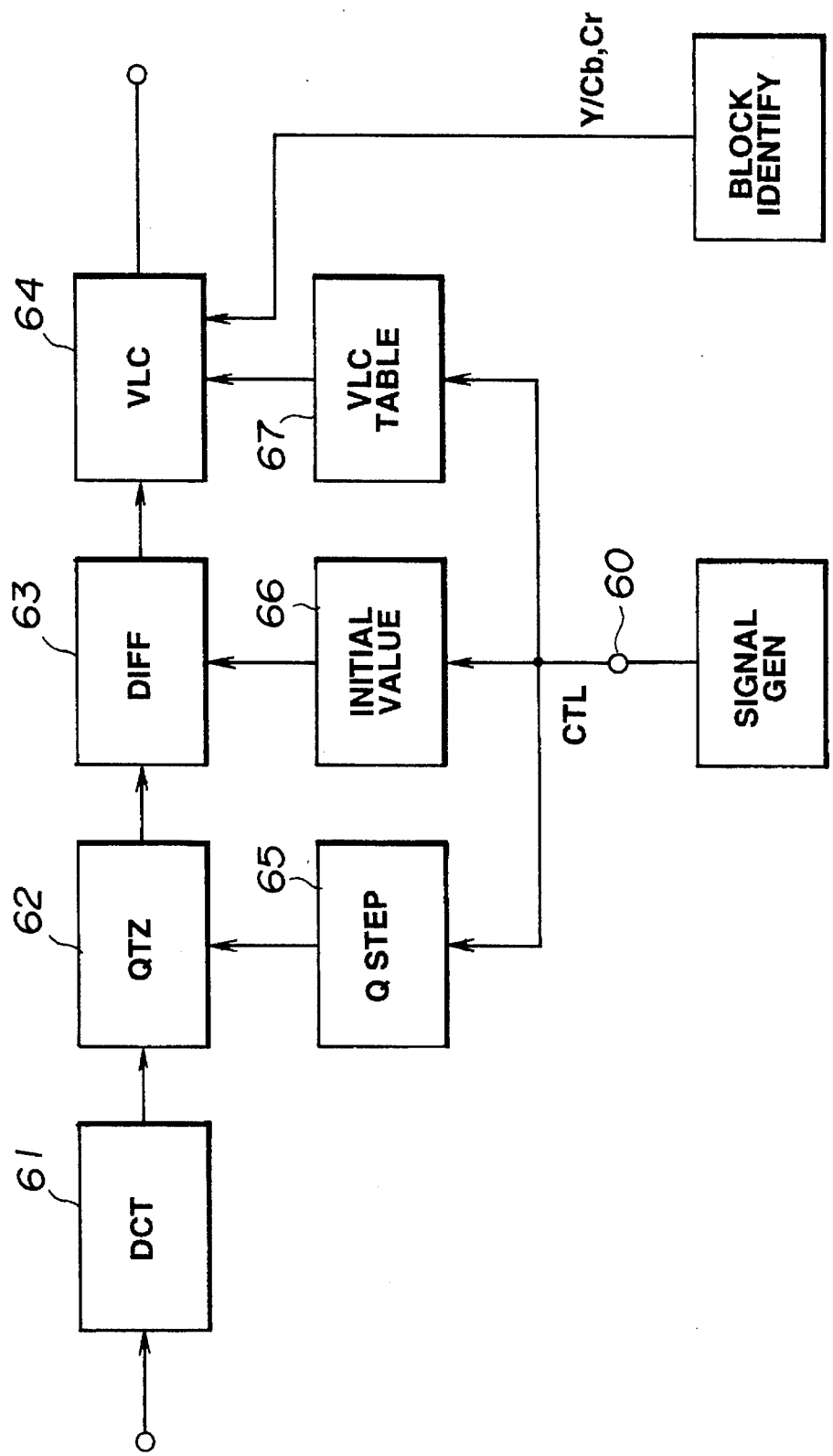
FIG. 7 is a diagram used in explaining encoding according to the present invention.

Referring now to the drawings, and in particular to FIG. 7, there is illustrated an encoding apparatus according to the present invention. The apparatus illustrated in FIG. 7 includes an input terminal 60, a DCT circuit 61, a quantizer 62, a differentiator 63, a VLC encoder 64, a quantization step width circuit 65, an initial value circuit 66, and a VLC table circuit 67.

A signal CTL, representing a required precision expressed in terms of quantization bits for DC component coefficients from an orthogonal transformation such as a DCT, is supplied to a terminal 60. The signal CTL may be supplied for each sequence, GOP, picture, slice, macroblock or block.

The required precision represented by the signal CTL is determined by quantities per unit time such as the transmission speed or transmission capacity of a transmission line and a recording density of a recording medium. Optionally, the signal CTL can be determined in view of the quality of the decoder and the quality of the picture to be encoded.

In this embodiment shown in FIG. 7, the signal CTL specifies one of four different bit counts expressing a precision of eight to eleven bits. In the case of an eight-bit precision, levels in the range 0 to 255 can be expressed. For nine-bit precision, levels in the range 0 to 511 can be represented. Similarly, ten-bit and eleven-bit precisions can be used for expressing levels in the ranges 0 to 1023 and 0 to 2047 respectively.

A DCT circuit 61 is adapted to orthogonally transform blocks of pixels representing a picture into 8×8 blocks of DCT coefficients, and to supply the DCT coefficients to a quantizer 62 which functions to linearly quantize the DC component coefficients, that is, to divide the coefficients by a variable quantization step width, to produce quantized coefficients.

A quantization step width circuit 65 functions to provide the variable quantization step width to the quantizer 62 in accordance with the precision of the direct-current component coefficients specified by the signal CTL. The quantization step width has a value of 8, 4, 2 or 1 for a specified precision of 8, 9, 10, or 11 bits, respectively. Thus, when eleven-bit precision is required, the value of the DCT DC component coefficient is not quantized.

Figure 5A:
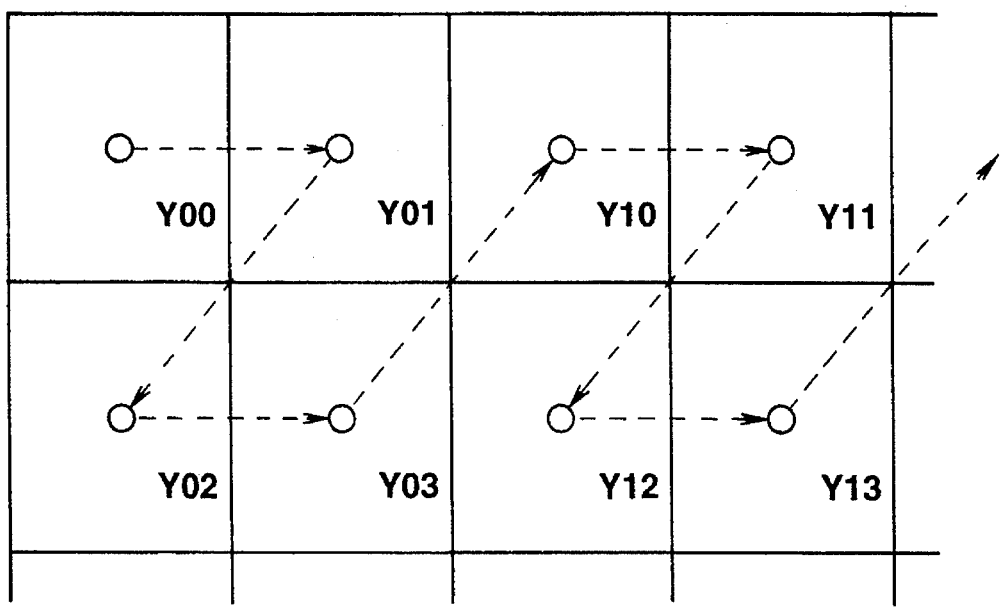
FIGS. 5A and 5B are diagrams showing the order in which differentiation and inverse-differentiation, respectively, occur.
Figure 5B:
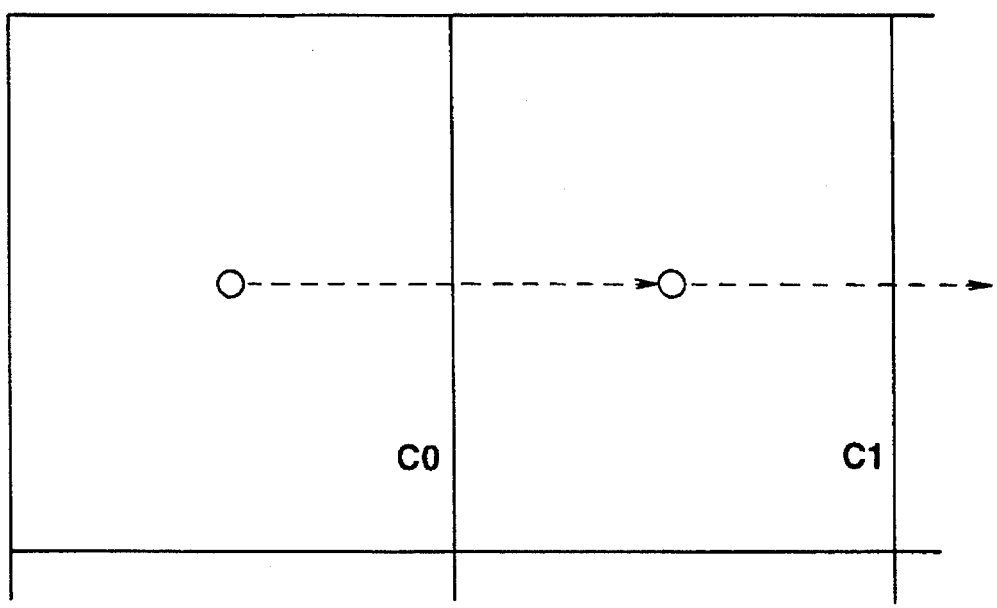

A differentiation circuit 63 is adapted to receive the quantized coefficients and to differentiate the DC component coefficients to produce differentiated DC component coefficients. The differentiation process is carried out independently for the four luminance (Y) blocks and two chrominance (Cb and Cr) blocks in a macroblock, as generally shown in FIGS. 5A and 5B, respectively.

An initial value circuit 66 functions to reset the initial value used in differentiating a block for the first block in each slice and for a block completing the first intra picture encoding process following a block completing an inter picture encoding process. The setting of the initial value depends on the coefficient precision specified by the signal CTL. To be more specific, the initial value is 128, 256, 512 or 1024 for a specified coefficient precision of 8, 9, 10 or 11 bits respectively. The initial values each determine the center value of a dynamic range. If a bright or dark value can be specified in accordance with the scene, the picture quality of the first block will be improved.

A VLC encoder 64 is adapted to receive the differentiated DC component coefficients and to encode them to produce encoded coefficients in accordance with the precision or the number of quantization bits specified by the signal CTL. Each encoded coefficient is a concatenation of a variable-length code representing the number of bits used to represent the differentiated coefficient and a fixed-length code representing a differentiated coefficient.

FIG. 8 shows a C language source code listing of an program which may be used by the VLC encoder 64.

The VLC encoder 64 uses the differential DC component coefficient value to obtain a corresponding size value, that is, number of bits that will be used to encode the differential DC component coefficient, from a table shown as FIG. 9A.

Next, the VLC encoder 64 encodes the size value using, for luminance blocks, a table shown as FIG. 9B, and for chrominance blocks, a table shown as FIG. 9C.

Then, the VLC encoder 64 encodes the differential DC component coefficient using a fixed-length code from the table shown in FIG. 9A. The fixed length code has a unique code value for each unencoded value.

Finally, the encoded differential DC component coefficient value is the result of concatenating the variable-length code representing the number of bits that are used to represent the differential DC component coefficient and the fixed-length code representing the differential DC component coefficient.

The tables in FIGS. 9A–9C correspond to the tables in FIGS. 6A–6C extended to include 9, 10 and 11 bit encoding for additional precision. The code tables in FIGS. 9A–9C are shown as having fixed contents. Alternatively, code tables which are modified in accordance with results of statistical observation of input signals can be used.

A VLC table circuit 67 is adapted to store the tables shown in FIGS. 9A–9C and to provide data to the VLC encoder 64. The circuit 67 may be realized as read only memory (ROM). The ROM contents are read out from the ROM memory by a CPU, not shown for ease of illustration.

The encoded differential DCT DC component coefficients produced by the VLC encoder 64 are then combined with AC component coefficients into a bit stream to which an error correcting code is added. The error correction encoded bit stream may be stored on a recording medium or transmitted through a transmission line. At that time, the signal CTL can be appended to each associated sequence, GOP, picture, slice, macroblock or block as an identification signal.

FIGS. 10A and 10B show a typical description of the header of a picture layer. The header includes a two-bit identification signal intra_dc_precision, corresponding to the signal CTL, used for selecting one of four extended encoding precision values.

A decoding apparatus according to the present invention will now be described with reference to FIG. 11.

Figure 11:
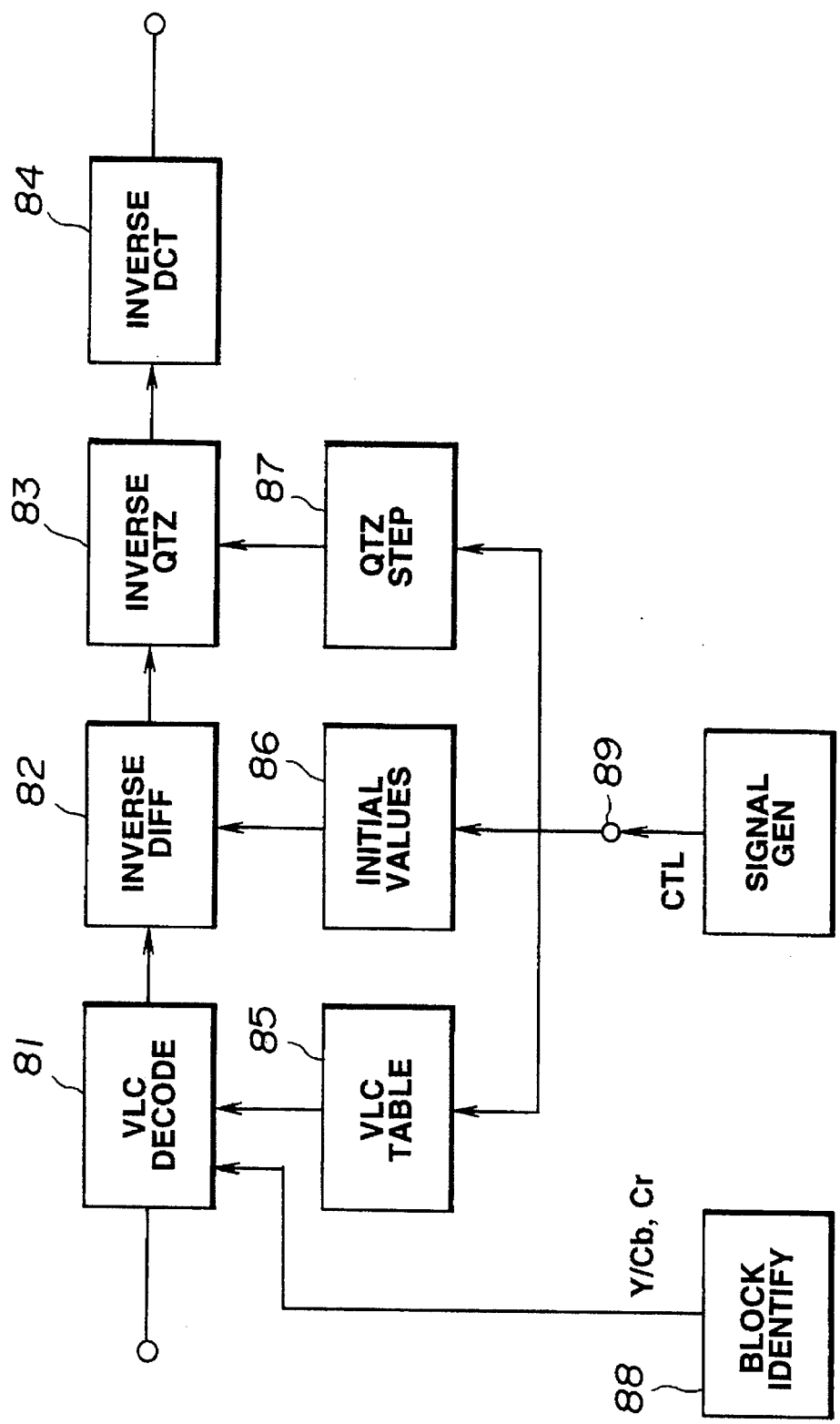
FIG. 11 is a diagram used in explaining decoding according to the present invention.

The apparatus illustrated in FIG. 11 includes a VLC decoder 81, an inverse differentiator 82, an inverse quantizer 83, an inverse DCT circuit 84, a VLC table circuit 85, an initial value circuit 86, a quantization step width circuit 87, a block identifier 88 and an input terminal 89.

The bit stream produced by the encoding apparatus described earlier is supplied to the decoding apparatus through a transmission line or from a recording medium such as an optical disk.

A signal CTL is supplied to an input terminal 89 through a demodulation circuit which is not shown in FIG. 11. As described earlier, the signal CTL represents, the required precision of 8, 9, 10 or 11 quantized bits for each DC component coefficient resulting from an orthogonal transformation such as the DCT for each video sequence, GOP, picture, slice, macroblock or block portion of a video signal.

Additionally, the decoding apparatus according to the present invention can locally generate a signal CTL. In such case, it is necessary to synchronize the signal CTL generated by the decoding apparatus with the signal CTL set in the encoding apparatus.

For example, if a disk is used as a recording medium and a uniform precision is set for the entire disk, it is possible for a disk playback apparatus, which has a demodulation unit designed for high-quality pictures, that is, which allows specification of a precision of 8 to 11 quantized bits per DC component coefficient, to play back motion video pictures with a uniform picture quality. On the other hand, a disk playback apparatus with a demodulation unit designed for only an eight-bit precision cannot play back high-quality pictures having a precision of 9, 10 or 11 bits from a disk. However, it is possible to present the so-called picture quality adjusted to such a disk playback apparatus.

Similarly, the demodulation unit may provide for all selectable precisions, or may allow for a predetermined precision suitable for a specific type or a specific model of disk playback apparatus.

With the signal CTL, a variable-length code representing a number of bits in a following fixed length code and the fixed-length code representing a DC component coefficient are supplied to a VLC decoder 81 through, among other components, a demodulation circuit which is not shown. The VLC decoder 81 functions to decode these variable-length and fixed-length codes using an algorithm which may implemented as a C language computer program shown in FIG. 12 to produce differentiated DC component coefficients.

A VLC table circuit 85 is adapted to store the tables shown in FIGS. 9A–9C, and to provide stored data to the VLC decoder 81.

An inverse differentiator 82 serves to receive the differentiated DC component coefficients and to apply an inverse-differentiation process among adjacent blocks to recover quantized DC component coefficients. Each inverse-differentiation process is carried out independently for the four luminance (Y) blocks and two chrominance (Cb and Cr) blocks in order to recover the quantized DC component coefficients. In a complementary manner to differentiation explained with reference to FIGS. 5A and 5B, a differentiated DC component coefficient of a luminance block undergoes inverse differentiation in a zigzag order from upper left to upper right to lower left to lower right blocks in a macroblock. The differentiated DC component coefficients in these blocks are then respectively replaced with the recovered DC component coefficients. For the chrominance blocks, differentiated DC component coefficients of right and left blocks adjacent to each other undergo inverse differentiation to produce recovered DC component coefficients which replace the differentiated DC component coefficients in the respective blocks.

An initial value circuit 86 functions to reset an initial value in these inverse differentiation processes in the first block of a slice or a block completing the first intra picture encoding process following a block completing an inter picture encoding process. The initial value varies, depending upon the specified coefficient precision. To be more specific, the initial value is 128, 256, 512 or 1024 for a specified coefficient precision of 8, 9, 10 or 11 bits respectively.

An inverse quantizer 83 is adapted to receive the recovered quantized DC component coefficients and to apply an inverse-linear-quantization process thereto using a variable quantization step width. Specifically, the inverse quantizer 83 multiplies each quantized DC component coefficient by the quantization step width to produce a DC component coefficient.

A quantization step width circuit 87 is adapted to supply the variable quantization step width to the inverse quantizer 83 in accordance with the signal CTL. More specifically, the value of the quantization step width is 8, 4, 2 or 1 for a specified precision of 8, 9, 10 or 11 bits respectively.

An inverse DCT circuit 84 functions to receive the DC component coefficients and to use it as the coefficient F(0,0) shown in FIG. 1. The AC component coefficients are supplied from other inverse DCT circuits, not shown, to form the 8×8 matrix shown in FIG. 1. The inverse DCT circuit 84 functions to apply a two-dimensional inverse DCT process to the matrix to restore the original luminance or chrominance signal.

The luminance or chrominance signal may be restored with a level different from that of the original signal due to the linear/inverse-linear-quantization processes. However, the DCT and inverse DCT are known to have a peculiar property that raw data can be estimated from a relation among adjacent coefficients, so that large errors can be prevented which avoids serious problems.

An encoding apparatus according to the present invention will now be described in more detail with reference to FIGS. 13–17. The present invention can be applied to a case in which the picture structure is a frame or field. However, the following description is for a case in which the picture structure is a frame. For convenience, it is assumed that the required picture quality may be changed only at each sequence, GOP, picture or slice portion of a video signal. One skilled in the art will appreciate how to modify the following apparatus if the required picture quality may also change at each macroblock or block portion of the video signal.

Figure 13:
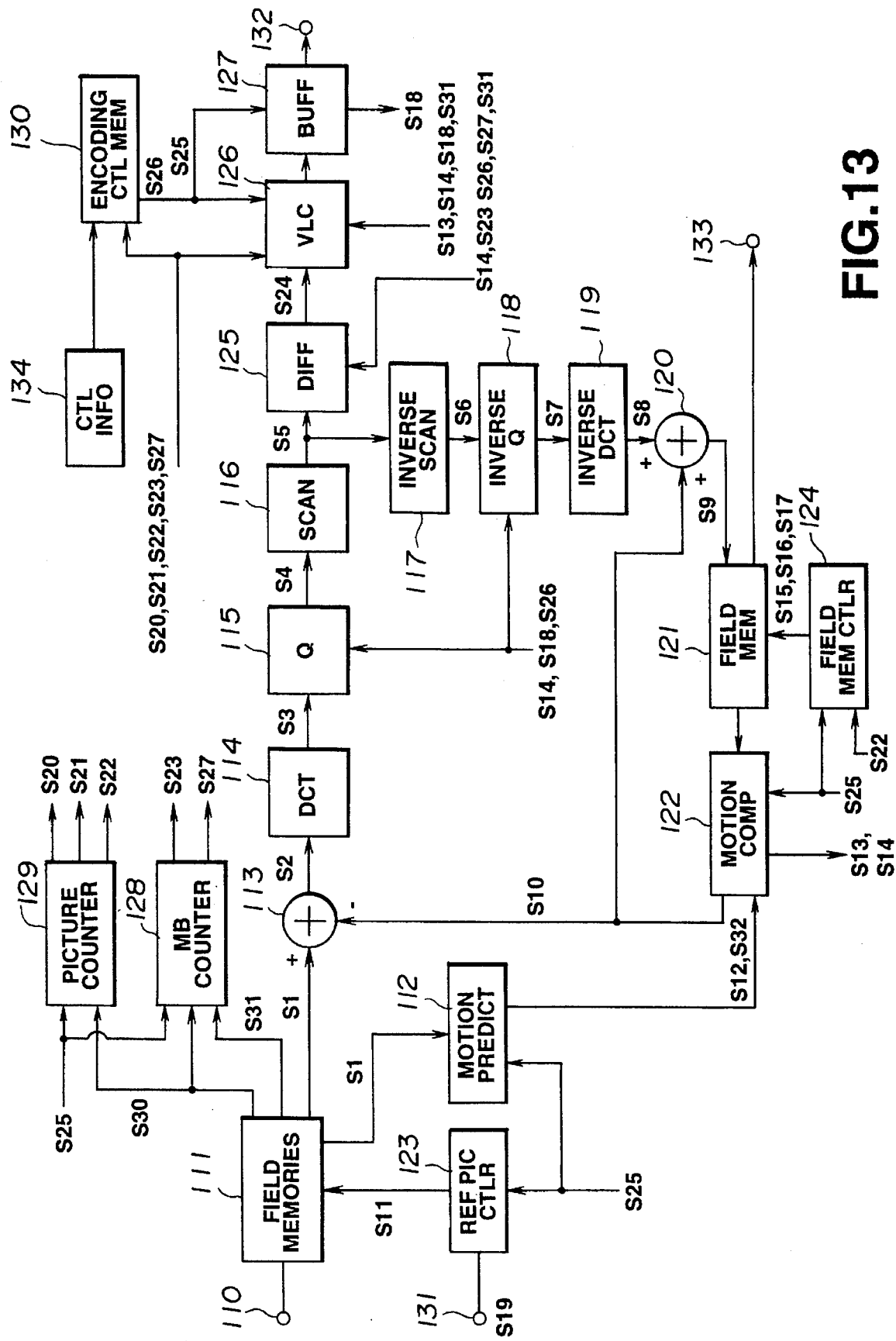
FIG. 13 is a block diagram showing an embodiment of a motion video picture encoding apparatus in accordance with the present invention.

FIG. 13 shows an encoding apparatus according to the present invention, and includes input terminals 110, 131, output terminals 132, 133, field memories 111, motion predictor 112, subtractor 113, DCT circuit 114, quantizer 115, scan converter 116, inverse scan converter 117, inverse quantizer 118, inverse DCT circuit 119, adder 120, field memories 121, motion compensator 122, reference picture controller 123, field memory controller 124, differentiator 125, VLC encoder 126, buffer memory 127, macroblock (MB) counter 128, picture counter 129, encoding control memory 130, and control information circuit 134.

The signals used by the encoding apparatus of FIG. 13 include the following signals: pixel block S1, difference S2, DCT coefficient S3, quantized DCT coefficient S4, sequential coefficient S5, restored sequence S6, recovered coefficient S7, decoded pixel block S8, recovered picture S9, prediction S10, reference picture command S11, motion vector S12, motion vector S13, motion compensation mode S14, motion compensating reference picture command S15, picture command signal S16, output picture command S17, quantization step width S18, vertical synchronization S19, video sequence start flag S20, GOP start flag S21, picture start flag S22, slice start flag S23, differentiated coefficient S24, control information S25, intra_dc_precision S26, MB address S27, picture read out S30, MB start S31, and motion compensation mode S32.

A control information circuit 134 is adapted to store information for controlling the basic operation of the encoding apparatus and to provide the stored information to an encoding control memory 130 when picture encoding is to occur. The information includes, among other data, a screen size, an output bit rate of encoded information, a picture structure signal and a picture encoding type. The picture structure signal is an identification signal for indicating whether a picture has a frame or field structure. The picture type is an identification signal for indicating whether a picture to be encoded is an I, P or B picture. The encoding control memory 130 is adapted to read out this information as a control information signal S25, and to supply it to a motion predictor 112, a reference picture controller 123, a motion compensator 122, a field memory controller 124, a VLC encoder 126, a buffer memory 127, a MB counter 128 and a picture counter 129.

The memory 130 also is adapted to store an intra_dc_precision code S26 used to vary the encoding precision of the DC coefficients. The intra_dc_precision code signal S26 corresponds to the CTL signal of FIG. 7 explained earlier. To switch the encoding precision of the DC coefficients for a layer, the intra_dc_precision code S26 must be present in the appropriate one of the video sequence header, GOP header, picture header or slice header. As shown in the sample picture layer header of FIG. 10B, the intra_dc_precision code S26 may comprise a two bit code for specifying four different encoding precisions. For example, intra dc precision codes S26 having values '00', '01', '10' and '11' may specify encoding precisions of 8, 9, 10 and 11 quantization bits per DC component coefficient, respectively. The memory 130 supplies the intra_dc_precision code S26 to a quantization circuit 115, an inverse-quantization circuit 118, a DC-coefficient differentiator 125 and the VLC unit 126.

An input terminal 131 serves to receive a vertical-synchronization signal S19 and to supply it to the reference picture controller 123 which functions to produce a reference picture command signal S11 to field memories 111 synchronously with the vertical synchronization signal S19.

An input terminal 110 serves to receive blocks of pictures and to supply these blocks to the field memories 111 which are adapted to store these blocks and to sequentially read them out as a pixel block signal S1 separately to a motion predictor 112 and a subtractor 113 from addresses specified by the reference-picture command signal S11. Although the information is read out in block units, it is actually processed in macroblock units. That is to say, six blocks Y0 to Y3, Cr and Cb, as shown in FIG. 2 undergo the same processes in the apparatus simultaneously.

The field memories 111 are also adapted to produce a picture read out signal S30 when a picture to be encoded begins to be read out therefrom, and to produce a MB start flag signal S31 when a macroblock portion of a picture to be encoded begins to be read out therefrom.

The motion predictor is operable to process picture data of each field as an I, P or B picture based on the control information signal S25. The determination as to whether the picture data of each field is to be processed as an I, P or B picture is done in advance. Whether processing is to occur in GOP units, for example, is also determined in advance.

The motion predictor 112 is also operable to detect a motion vector between a forward raw picture read out from the field memories 111 and a current reference picture also read from the field memories 111, and a motion vector between a backward raw picture read out from the field memories 111 and the current reference picture. A forward raw picture is a picture temporally preceding a current picture to be encoded. A backward raw picture is a picture temporally succeeding the current picture to be encoded. A current reference picture is the current picture to be encoded.

The motion predictor 112 computes sums of absolute values of prediction errors (differences among fields for each block) to select the minimum among intra picture prediction, forward prediction, backward prediction or bidirectional prediction. For intra picture prediction, the difference between $|\Sigma A_{ij}|$ and $\Sigma |A_{ij}|$ is found, where $|\Sigma A_{ij}|$ is the absolute value of the sum of signals $A_{ij}$ of macroblocks of a reference picture whereas $\Sigma |A_{ij}|$ is the sum of the absolute values of the signals $A_{ij}$. For forward prediction, the sum of absolute values $\Sigma |A_{ij}-B_{ij}|$ is found, where $A_{ij}$ are the macroblock signals of a reference picture, $B_{ij}$ are the macroblock signals of a forward raw picture, and $|A_{ij}-B_{ij}|$ is the absolute value of the difference between $A_{ij}$ and $B_{ij}$. The sum of the absolute values of prediction errors for the backward prediction and that for the bidirectional prediction can be found in the same way as the forward prediction except that, for the backward prediction, the forward raw picture is replaced by a backward raw picture whereas, in the case of the bidirectional prediction, the forward raw picture is replaced typically by an average value of the forward and backward raw pictures.

The motion predictor 112 further selects a minimum among the sums of the absolute values of prediction errors for the forward, backward and bidirectional predictions as a sum of the absolute values of prediction errors for the inter picture prediction. The motion predictor 112 then compares this minimum to the sum of the absolute values of prediction errors for the intra picture prediction described above in order to identify the smaller of the two. A mode corresponding to the identified smaller one is finally selected as a motion-compensation mode. That is to say, if the sum of the absolute values of prediction errors for the intra picture prediction is smaller, an intra picture-prediction mode is set. Otherwise, a forward, backward or bidirectional-prediction mode corresponding to the minimum selected above is set.

From the above calculation based on the macroblock signals of the reference signal, the motion predictor 112 detects a motion vector between the reference picture and a predicted picture in one of four motion compensation modes: intra picture, forward, backward or bidirectional prediction.

The motion predictor 112 operates to output the minimum value as a motion vector S12 and a motion compensation mode signal S32 to a motion compensator 122.

When the motion compensation mode signal S32 indicates intra field (intra picture) encoding (prediction) mode, the pixel block signal S1 for the picture to be encoded is read out from the field-memory unit 111 to the subtractor 113 which functions to simply pass it through unchanged as a difference signal S2 to a DCT circuit 114.

When the motion compensation mode signal S32 indicates the forward, backward or bidirectional prediction mode, the subtractor 113 functions to subtract a prediction signal S10 from the pixel block signal S1 to produce the difference signal S2 which is supplied to the DCT circuit 114.

The DCT circuit 114 functions to apply an orthogonal transformation, specifically the DCT, to the difference signal S2 supplied thereto to produce a DCT coefficient signal S3 and to supply the signal S3 to the quantizer 115.

The quantizer 115 is adapted to quantize the DCT coefficients S3 in accordance with a quantization step width signal S18 to produce a quantized DCT coefficient signal S4 and to supply the signal S4 to a scan converter 116. The quantizer 115 serves to perform either linear or non-linear quantization, in accordance with a qscale_type signal supplied thereto, although not shown in FIG. 13. A code "qscale_type", shown in FIG. 10B immediately below the intra_dc_precision code, is a single-bit code for specifying which of linear and non-linear quantization is to be performed, for example, by the values 0 and 1, respectively. The quantizer 115 is explained in detail below with reference to FIG. 14.

The scan converter 116 serves to scan the quantized DCT coefficients S4 in a zigzag manner from lowest-frequency coefficient to highest-frequency coefficient to produce a sequential coefficient signal S5, and to supply the signal S5 to an inverse scan converter 117 and the differentiator 125. The scan converter 116 outputs only data for I and P pictures to the inverse-scan converter 117 and does not output data for a B picture.

The inverse scan converter 117 is adapted to operate in a manner complementary to the scan converter 116, that is, the inverse scan converter 117 performs an inverse-zigzag scanning process on the sequential coefficient signal S5 to produce a restored sequence signal S6 and supplies the signal S6 to the inverse quantizer 118.

The inverse quantizer 118 is adapted to operate in a manner complementary to the quantizer 115, that is, generally to multiply the coefficients in the signal S6 by the quantization step width S18 to produce a recovered coefficient signal S7 and to supply the signal S7 to an inverse DCT circuit 119. The inverse quantizer 118 serves to perform either linear or non-linear inverse quantization, in accordance with the qscale_type signal supplied thereto, although not shown in FIG. 13. The inverse quantizer 118 is explained in detail below with reference to FIG. 15.

The inverse DCT circuit 119 is adapted to operate in a manner complementary to the DCT circuit 114 to produce a decoded pixel block signal S8, and to supply the signal S8 to an adder 120.

In the intra picture prediction mode, the adder 120 functions to simply pass the decoded pixel block signal S8 to field memories 121 as a recovered picture signal S9. In the forward, backward or bidirectional prediction mode, the adder 120 functions to add the decoded pixel block signal S8 to the prediction signal S10 on a pixel by pixel basis to produce the recovered picture signal S9.

The field memories 121 are adapted to store the recovered picture S9 at addresses specified by a picture command signal S16. The recovered picture S9 is identified as a picture used in backward or forward prediction by a motion compensating reference picture command signal S15. Since the scan converter 116 outputs only data for I and P pictures to the inverse-scan converter 117, only data for I and P pictures is stored in the field-memory unit 121. There is no need to store data for a B picture because B pictures are not used in predictive encoding. The field memories 121 are also adapted to transmit the pictures stored therein to an output terminal 133 at a timing determined by an output picture command signal S17 so that it may be displayed on a monitor for verification.

The motion compensator 122 functions to receive the signals S12, S32 and to perform motion compensation on a picture stored in the field memories 121 to produce the prediction signal S10. Specifically, when the forward, backward or bidirectional-prediction modes are indicated by the motion compensation mode signal S32, the motion compensator 122 shifts the read addresses applied to the field memories 121 by a displacement corresponding to the motion vector S12, and transmits the data read out from the shifted addresses of field memories 121 as the prediction signal S10. In the bidirectional-prediction mode, picture portions for each of the forward and backward predictions are read out from the field memories 121 in accordance with the motion compensating reference picture command signal S15 and summed to compute an average value to be output as the prediction signal S10.

The motion compensator 122 also functions to supply the motion vector signal S12 as a motion vector signal S13, and to supply the motion compensation mode signal S32 as a motion compensation mode signal S14.

A field memory controller 124 is operable to receive a picture start flag S22 and the control information signal S25, and to produce the motion compensating reference picture command signal S15, the picture command signal S16 and the output picture command signal S17 synchronously with a picture-start flag S22, and to supply the signals S15, S16, S17 to the field memories 121.

The differentiator 125 is operable to differentiate the DC component coefficients in the sequential coefficients S5 supplied thereto to produce a differentiated coefficient signal S24, and to supply the signal S24 to the VLC encoder 126. The differentiator 125 is explained in detail below with reference to FIG. 16.

The VLC encoder 126 is adapted to encode the motion vector S13, motion compensation mode S14, differentiated coefficients S24 and quantization step width S18 to produce Huffman encoded data and to supply the encoded data to a buffer memory 132.

A video sequence start flag S20, a GOP start flag S21, the picture start flag S22, a slice start flag S23 and a MB address signal S27 are also supplied to the VLC encoder 126. Setting of one of the flags S20, S21, S22, S23 prompts the VLC encoder 126 to generate a start code for a video sequence, GOP, picture and slice, respectively. Control information for the encoded data of the respective signal layer portion is then read out from the memory 130 as header data. The start codes and header data are part of the signal output from the VLC encoder 126 to the buffer memory 127.

The buffer memory 127 serves to temporarily store the Huffman encoded data, and then to apply it to an output terminal 132 as a bit stream at a constant transmission rate. The buffer memory 127 also serves to supply the quantization step width signal S18 representing the amount of data stored therein to the quantizer 115. If the amount of data in the buffer memory 127 exceeds an allowable maximum limit, the quantization step width S15 is increased to decrease the amount of quantized coefficients S4. If the amount of data in the buffer memory 127 falls below an allowable minimum limit, the quantization step width S15 is decreased to increase the amount of quantized coefficients S4. The buffer memory 127 thereby adjusts the amount of data to be generated as a bit stream, ensuring a proper data output rate which avoids both overflow and underflow in the buffer memory 127.

The bit stream output by the buffer memory 127 is typically multiplexed with, among other things, an encoded audio signal and a synchronization signal. Error-correction codes are further added to the bit stream and, after undergoing predetermined modulation, the bit stream is stored on a recording medium such as an optical disk using a laser beam.

The MB counter 128 is adapted to receive the picture read out signal S30 and to be reset to zero in response thereto. The MB counter 128 is also adapted to receive the MB start flag S31 and to count the number of blocks read out from the field memories 111 in response thereto. The MB counter 128 supplies its macroblock count as the MB address signal S27.

For more efficient compression of a video signal, only the first macroblock in each slice may have an absolute address indicating its position in a picture. Subsequent macroblocks in the slice may each have an address relative to the absolute address of the first macroblock in the slice. The macroblock address signal S27 provides the relative address for these subsequent macroblocks.

The MB counter 128 is also adapted to receive a slice length, that is, the number of macroblocks which constitute a slice, as part of the control information signal S25. When the macroblock count reaches a predetermined multiple of the slice length, the MB counter is adapted to generate (set) the slice start flag 23. At other times, the slice start flag is in a reset state. The slice length can change a bit stream output from the buffer-memory unit 127, depending upon an error state of a transmission line for transmitting the bit stream, that is, depending upon the reliability of the transmission line. In general, the higher the probability that a transmission error occurs on the transmission line, the shorter the value at which the slice length is set.

The picture counter 129 is adapted to be reset to zero when the encoding of a video sequence begins, and to generate (set) a video sequence start flag S20 upon being reset. The picture counter 129 is also adapted receive the picture read out signal S30 and to generate (set) the picture start flag S22 in synchronism with the picture read out signal S30.

The picture counter 129 is further adapted to receive a GOP length, that is, the number of pictures which constitute a GOP, as part of the control information signal S25. A typical GOP length may be 12 or 15 frames. The picture counter 129 counts the number of pictures read out from the field memories 111, and when its count of the number of pictures reaches a predetermined multiple of the GOP length, the picture counter 129 is adapted to generate or set the GOP start flag S21.

Figure 14:
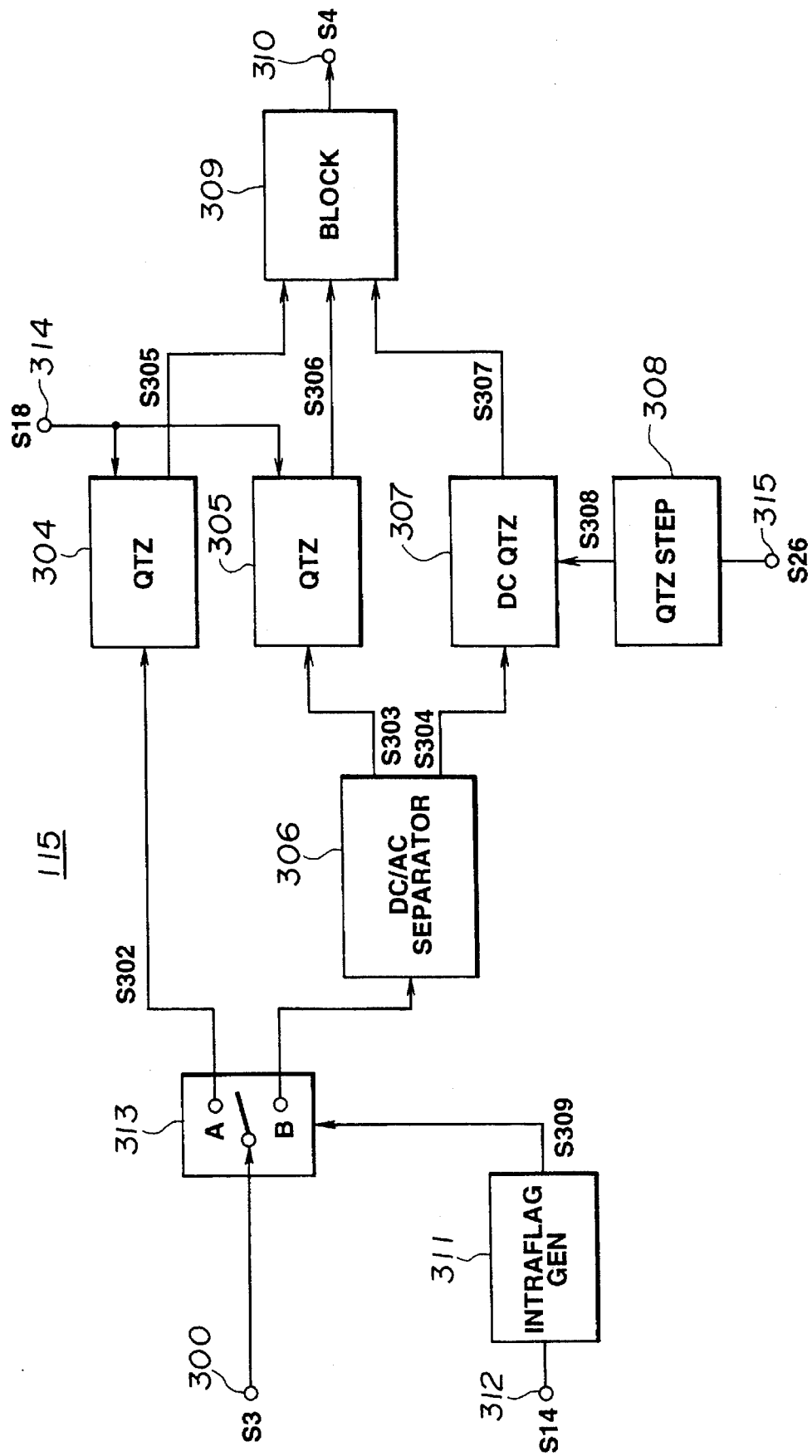
FIG. 14 is a block diagram of a quantizer 115 shown in FIG. 13.

FIG. 14 shows a detailed embodiment of the quantizer 115.

The quantizer 115 is seen to include input terminals 300, 312, 314, 315, quantization units 304, 305, DC/AC coefficient separator 306, DC coefficient quantization unit 307, quantization step generator 308, blocking circuit 309, output terminal 310, intra flag generator 311, and switch 313.

The motion compensation mode signal S14 is supplied to an input terminal 312 which applies the signal S14 to an intra flag generator 311. The intra flag generator 311 is adapted to set an intra flag S309 when the motion-compensation mode signal S14 indicates that intra picture encoding is to be performed. For example, if the intra flag S309 is normally at the logic value 0, the generator 311 sets the signal S309 to 1 when intra picture encoding is to be done.

The DCT coefficient signal S3, an 8×8 block of DCT coefficients, is supplied to an input terminal 300, which applies the signal S3 to a switch 313. The switch 313 functions to select a pole A when the intra flag S309 indicates that forward, backward or bidirectional encoding is to be performed. Accordingly, the DCT coefficients S3 are supplied to a quantization unit 304 as a signal S302. The switch 313 also functions to select a pole B when the intra flag S309 indicates that intra picture encoding is to be performed. In this case, the DCT coefficients S3 are supplied to a DC/AC-coefficient separator 306.

The quantization step width signal S18 is supplied to an input terminal 314, and is then applied to the quantization units 304, 305.

The quantization unit 304 is adapted to receive the DCT coefficient signal S302 and the quantization step width signal S18, and to quantize the signal S302 in accordance with the signal S18 to produce quantized DCT coefficients, and to supply the quantized DCT coefficients as a signal S305 to a blocking circuit 309. In the case of MPEG data, the fractional part of a quantized coefficient is normally truncated by the quantization unit 304 during quantization.

The blocking circuit 309 serves to block the quantized coefficients S305 into a block of 8×8 coefficients which are then supplied to an output terminal 310 for application to the scan converter 116 shown in FIG. 13.

The DC/AC coefficient separator 306 is operable to split the DCT coefficients S3 into AC coefficients S303 and DC coefficients S304, and to supply the AC coefficients S303 to the quantization unit 305 and the DC coefficients S304 to a DC coefficient quantization unit 307.

The quantization unit 305 is adapted to receive the AC coefficients S303 and the quantization step width signal S18, and to quantize the signal S303 in accordance with the signal S18 to produce quantized AC coefficients, and to supply the quantized AC coefficients as a signal S306 to the blocking circuit 309. In the case of MPEG data, linear quantization is normally carried out.

The intra_dc_precision signal S26, representing a specified encoding precision expressed in terms of quantization bits for the DC coefficients, is supplied to an input terminal 315 and is then applied to a quantization step generator 308.

The quantization step generator 308 functions to generate a signal S308 representing a quantization step in accordance with the intra_dc_precision code S26, and to supply the signal S308 to the DC coefficient quantization unit 307. When the intra_dc_precision code S26 has the value '00', '01', '10' or '11', the quantization step signal S308 specifies that DC coefficients are to be encoded with a precision of 8, 9, 10 or 11 bits, respectively.

The DC coefficient quantization unit 307 is adapted to linearly quantize the DC coefficients S304 in accordance with the quantization step signal S308. The rounding method adopted for the result of the linear quantization counts a fraction of at least 0.5 as a whole number and disregards the rest. The linearly quantized DC coefficients, as rounded, are supplied to the blocking circuit 309 as quantized coefficients S307.

The AC coefficients S306 quantized by the quantization unit 305 and the DC coefficients S307 quantized by the quantization unit 307 are blocked by the blocking circuit 309 into a block of 8×8 coefficients which are then output as the blocked quantized coefficients S4 to the scan converter 116 shown in FIG. 13 through the terminal 310.

Thus, when the motion compensation mode signal S14 indicates intra picture-encoding (intra picture-prediction) mode, DC coefficients are quantized in the DC coefficient quantization unit 307 at the encoding precision specified by the intra_dc_precision signal S26.

Figure 15:
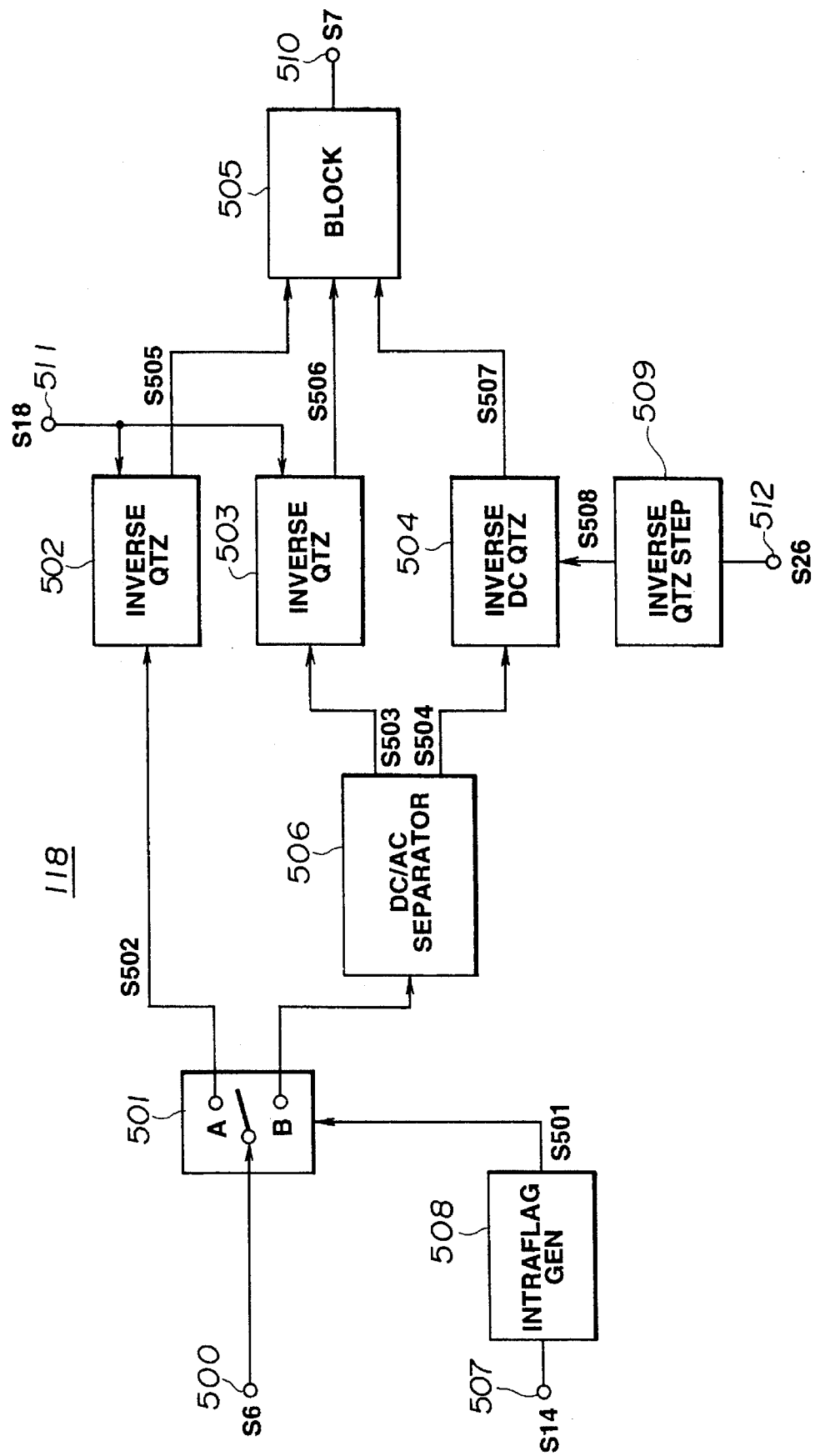
FIG. 15 is a detailed block diagram of an inverse quantizer 118 shown in FIG. 13.

FIG. 15 shows a detailed embodiment of the inverse quantizer 118.

The inverse quantizer 118 is seen to include input terminals 500, 507, 511, 512, switch 501, inverse quantization units 502, 503, DC coefficient inverse quantization unit 504, blocking circuit 505, DC/AC coefficient separator 506, intra flag generator 508, inverse quantization step generator 509, and output terminal 510.

The motion compensation mode signal S14 is supplied to an input terminal 507 which applies the signal S14 to an intra flag generator 508. The intra flag generator 508 is adapted to set an intra flag S501 when the motion-compensation mode signal S14 indicates that intra picture encoding is to be performed. For example, if the intra flag S501 is normally at the logic value 0, the generator 508 sets the signal S501 to 1 when intra picture encoding is to be done.

The restored sequence signal S6, that is, an 8×8 block of DCT coefficients, is supplied to an input terminal 500, which applies the signal S6 to a switch 501. The switch 501 functions to select a pole A when the intra flag S501 indicates that forward, backward or bidirectional decoding is to be performed. Accordingly, the DCT coefficients S6 are supplied to an inverse quantization unit 502 as a signal S502. The switch 501 also functions to select a pole B when the intra flag S501 indicates that intra picture decoding is to be performed. In this case, the DCT coefficients S6 are supplied to a DC/AC-coefficient separator 506.

The quantization step width signal S18, to be more precise, the inverse quantization step width signal S18, is supplied to an input terminal 511, and is then applied to the inverse quantization units 502, 503.

The quantization unit 502 is adapted to receive the DCT coefficient signal S502 and the quantization step width signal S18, and to inverse quantize the signal S502 in accordance with the signal S18 to produce recovered DCT coefficients, and to supply the recovered DCT coefficients as a signal S505 to a blocking circuit 505.

The blocking circuit 505 serves to block the recovered coefficients S505 into a block of 8×8 coefficients which are then supplied to an output terminal 510 for application to the inverse DCT circuit 119 shown in FIG. 13 as the recovered coefficient signal S7. In the case of MPEG data, linear inverse quantization is normally carried out in the inverse quantization unit 502 and a value equal to half the inverse quantization step S18 is added as an offset to a result obtained from the linear inverse-quantization.

The DC/AC coefficient separator 506 is operable to split the DCT coefficients S6 into AC coefficients S503 and DC coefficients S504, and to supply the AC coefficients S503 to the inverse quantization unit 503 and the DC coefficients S504 to a DC coefficient quantization unit 504.

The inverse quantization unit 503 is adapted to receive the AC coefficients S503 and the quantization step width signal S18, and to inverse quantize the signal S503 in accordance with the signal S18 to produce recovered AC coefficients, and to supply the recovered AC coefficients as a signal S506 to the blocking circuit 505. In the case of MPEG data, linear inverse quantization is normally carried out.

The intra_dc_precision signal S26, representing a specified encoding precision expressed in terms of quantization bits for the DC coefficients, is supplied to an input terminal 512 and is then applied to an inverse quantization step generator 509.

The inverse quantization step generator 509 functions to generate a signal S508 representing an inverse quantization step in accordance with the intra_dc_precision code S26, and to supply the signal S508 to the DC coefficient inverse quantization unit 504. When the intra_dc_precision code S26 has the value '00', '01', '10' or '11', the inverse quantization step signal S508 specifies that DC coefficients are to be decoded with a precision of 8, 9, 10 or 11 bits, respectively.

The DC coefficient inverse quantization unit 504 is adapted to linearly inverse quantize the DC coefficients S504 in accordance with the inverse quantization step signal S508. The recovered DC coefficients are supplied to the blocking circuit 505 as recovered coefficients S507.

The AC coefficients S506 recovered by the inverse quantization unit 503 and the DC coefficients S507 recovered by the inverse quantization unit 504 are blocked by the blocking circuit 505 into a block of 8×8 coefficients which are then output as the recovered coefficients S7 to the inverse DCT circuit. 119 shown in FIG. 13 through the terminal 510.

Figure 16:
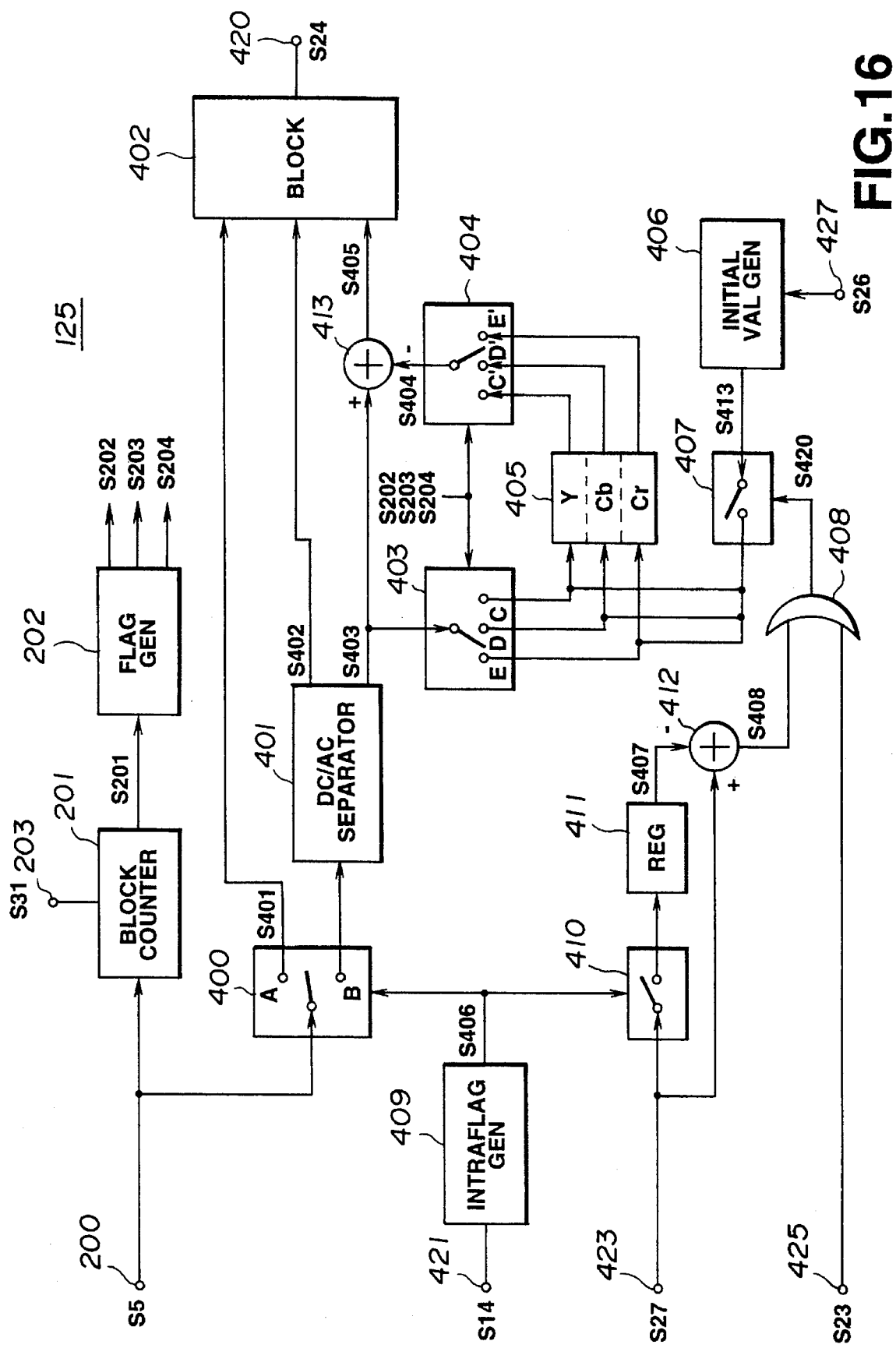
FIG. 16 is a detailed block diagram of a DC coefficient differentiator 125 shown in FIG. 13.

FIG. 16 shows a detailed embodiment of the differentiator 125.

The differentiator 125 is seen to include input terminals 200, 203, 421, 423, 425, 427, block counter 201, flag generator 202, switches 400, 403, 404, 407, 410, DC/AC coefficient separator 401, blocking circuit 402, registers 405, 411, register initial value generator 406, OR gate 408, intra flag generator 409, subtractors 412, 413, and output terminal 420.

The sequential coefficient signal S5, representing the quantized DCT coefficients, is supplied to an input terminal 200 which applies it to a block counter 201 and a switch 400.

The macroblock start flag S31 is supplied to an input terminal 203 which applies it to the block counter 201.

The block counter 201 functions to count the number of blocks in each macroblock of the coefficient signal S5 to produce a block count signal S201 and to supply the signal S201 to the flag generator 202. Specifically, the block count S201 has a value of 1, 2, 3, 4, 5, 6 as the respective blocks Y0, Y1, Y2, Y3, Cb, Cr in each macroblock are supplied. When the macroblock start flag S31 is set, the block counter 201 is reset.

The flag generator 202 is adapted to generate (set) a Y flag S202 when the value of the block count S201 is 4 or smaller to indicate that a luminance Y block is being supplied. The generator 202 is also adapted to set a Cb flag S203 when the value of the block count S201 is equal to 5, to indicate that the chrominance Cb block is being supplied. The generator 202 is further adapted to set a Cr flag S204 when the value of the block count S201 is equal to 6, to indicate that the chrominance Cr block is being supplied. The generator 202 supplies the signals S202, S203, S204 to switches 403, 404.

The motion compensation mode signal S14 is supplied to an input terminal 421 which applies it to an intra flag generator 409.

The intra flag generator 409 functions to set an intra flag S406, to a value of, for example 1, when the motion compensation mode signal S14 indicates the intra picture-encoding (intra picture-prediction) mode. The generator 409 supplies the intra flag S406 at the logic value 0 when the signal S14 does not indicate intra picture encoding, that is, indicates forward, backward or bidirectional encoding. The intra flag S406 is supplied to switches 400 and 410.

The switch 400 serves to select a pole A or B when the intra flag S406 has the logic value 0 or 1, respectively, so that when non-intra picture encoding is indicated, the coefficient signal S5 is supplied as a signal S401 to a blocking circuit 402, and when intra picture encoding is indicated, the coefficient signal S5 is supplied to the DC/AC coefficient separator 401.

The blocking circuit 402 is adapted to block the quantized coefficients S401 into an 8×8 block of coefficients, and to supply the blocked coefficients to a terminal 420 for application to the VLC unit 126 shown in FIG. 13 as the differentiated signal S16.

The DC/AC coefficient separator 401 is adapted to split the coefficient signal S5 into quantized AC coefficients S402 which are supplied to the blocking circuit 402, and into quantized DC coefficients S403 which are supplied to the switch 403 and a subtractor 413.

Figure 4A:
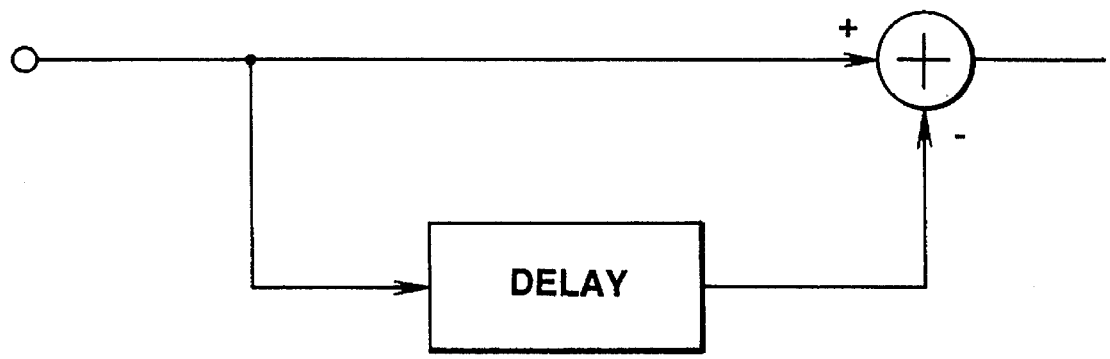
FIGS. 4A and 4B are block diagrams showing a differentiator and an inverse-differentiator, respectively.
Figure 4B:
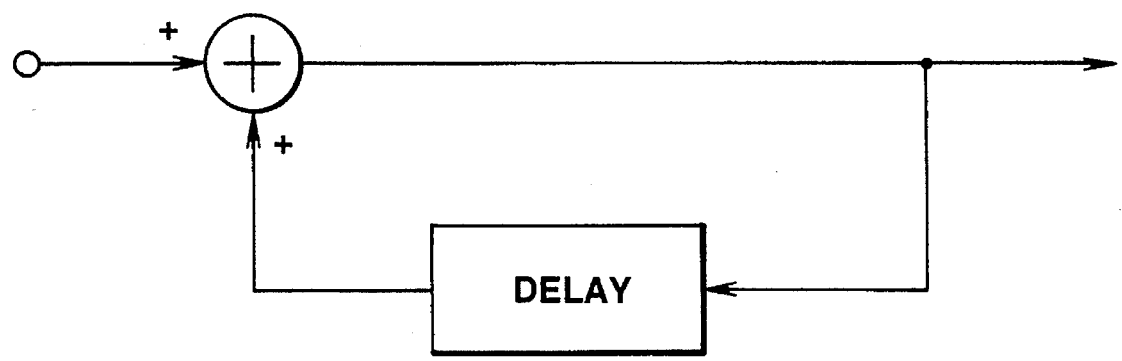

The switch 403, registers 405, the switch 404 and the subtractor 413 function to differentiate adjacent blocks forming macroblocks, as was described with reference to FIGS. 4A and 5A. The four chrominance blocks Y0 to Y3 and the two chrominance blocks Cb and Cr undergo differentiation processes independently.

More specifically, when the flag generator 202 sets the Y flag S202 and resets the Cb and Cr flags S203 and S204, indicating that the quantized DC coefficients S403 are from a luminance block, the switches 403 and 404 select poles C and C' respectively, to supply the quantized DC coefficients S403 to a Y register of the registers 405. The Y register 405 delays the luminance coefficients by a time corresponding to one block, then supplies these coefficients to a pole C' of the switch 404, which applies the coefficients as a delayed signal to the subtractor 413.

The subtractor 413 serves to receive the delayed signal S404 and the quantized DC coefficients S403 and to subtract the signal S404 from the signal S403 (S403–S404) to produce a signal S405 representing the difference between DC coefficients of two adjacent chrominance blocks. The subtractor 413 supplies the difference signal S405 to the blocking circuit 402.

When the flag generator 202 sets the Cb flag S203 and resets the Y and Cr flags S202, S204, indicating that the quantized DC coefficients S403 are from a chrominance Cb block, the switches 403 and 404 select poles D and D' respectively, to supply the quantized DC coefficients S403 to a Cb register of the registers 405. The Cb register 405 delays the chrominance Cb coefficients by a time corresponding to one macroblock, then supplies these coefficients to a pole D' of the switch 404, which applies the coefficients as a delayed signal to the subtractor 413. In similar manner as described above for the luminance Y blocks, the subtractor 413 produces a signal S405 representing differences in DC coefficients between chrominance blocks in two adjacent macroblocks.

When the flag generator 202 sets the Cr flag S204 and resets the Y and Cb flags S202 and S203, indicating that the quantized DC coefficients S403 are from a chrominance Cr block, the switches 403 and 404 select poles E and E' respectively. The chrominance Cr coefficients is delayed for one macroblock of time, then applied to the subtractor 413.

The blocking circuit 402 also blocks the differentiated DC coefficients of a block with quantized AC coefficients S402 from the DC/AC coefficient separator 401, and supplies the result as the signal S24 to the VLC unit 126 of FIG. 13.

When the MB address signal S27 for the macroblocks being encoded, produced by the MB counter 128 of FIG. 13, does not convey contiguous values or the DC coefficients belong to a first macroblock of a slice, the Y, Cb and Cr registers 405 are reset to an initial value S413 by a register initial-value generator 406.

The intra_dc_precision code S26, which represents the encoding precision for DC coefficients, is supplied to an input terminal 427 that applies it to the register initial value generator 406.

The register initial value generator 406 is operable to generate the initial value S413 for the Y, Cb and Cr registers in accordance with the intra_dc_precision code S26 as shown in the following table.

| S26 | REQUIRED PRECISION | S413 |
|---|---|---|
| 00 | 8 bits | 128 |
| 01 | 9 bits | 256 |
| 10 | 10 bits | 512 |
| 11 | 11 bits | 1024 |

The switch 407 is put into an OFF or ON state when a control signal S420 has a value of, for example, zero or one, respectively. When the switch 407 switches into the ON state, the initial value S413 is applied to each of the registers 405. The control signal S420 puts the switch 407 into the ON state when the MB address signal S27 of the MBs experiencing the intra picture encoding process does not convey contiguous values or the DC coefficients belong to a first macroblock of a slice.

The control signal S420 may be produced as follows.

The macroblock address signal S27 is supplied to an input terminal 423 which applies it to the switch 410 and to a subtractor 412. The switch 410 functions to supply the MB address S27 to a register 411 when the intra flag S406 indicates intra picture encoding. The register 411 is operable to delay the MB address S27 by a time corresponding to one MB, and to supply the delayed signal S407 to a subtractor 412.

The subtractor 412 serves to subtract the signal S407 from the signal S27 to produce a signal S408=S27–S407, and to apply the signal S408, representing address differences between adjacent macroblocks, to an input of an OR gate 408.

The slice start flag S23 is supplied to an input terminal 425 which applies it to another input of the OR gate 408.

The OR gate 408 functions to output the logic value 1 when the difference signal S408 is greater than unity (S408>1) or the slice start flag S23 is set. The OR gate 408 functions to otherwise output the logic value 0.

As described above, the differentiator 125 differentiates DC coefficients in accordance with the required encoding precision for the DC coefficients which can be changed at each video sequence, GOP, picture or slice unit.

Figure 17:
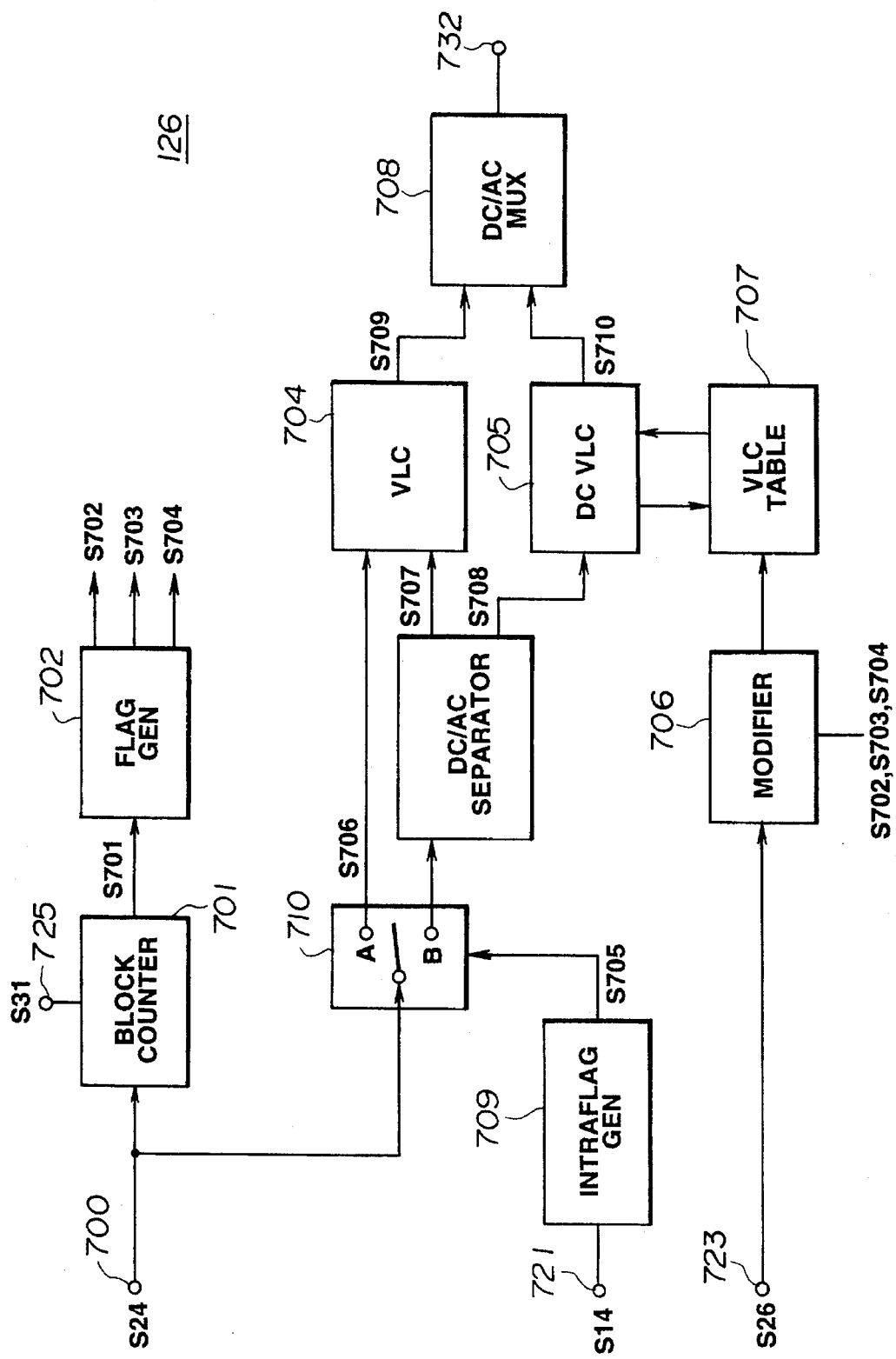
FIG. 17 is a detailed block diagram of a VLC encoder 126 shown in FIG. 13.

FIG. 17 shows a detailed embodiment of the VLC encoder 126.

The VLC encoder 126 is seen to include input terminals 700, 721, 723, 725, block counter 701, flag generator 702, DC/AC coefficient separator 703, two-dimensional variable length encoder 704, DC coefficient variable length encoder 705, variable length encoding table modifier 706, variable length encoding table storage 707, DC/AC coefficient multiplexer 708, intra flag generator 709, switch 710 and output terminal 732.

The differentiated coefficient signal S24 is supplied to an input terminal 700 which applies it to a block counter 701 and a switch 710.

The macroblock start signal S31 is supplied to an input terminal 725 which applies it to the block counter 701.

The block counter 701 functions to count the number of blocks in each macroblock of the differentiated coefficient signal S24 to produce a block count signal S701 and to supply the signal S701 to the flag generator 702. Specifically, the block count S701 has a value of 1, 2, 3, 4, 5, 6 as the respective blocks Y0, Y1, Y2, Y3, Cb, Cr in each macroblock are supplied. When the macroblock start flag S31 is set, the block counter 701 is reset.

The flag generator 702 is adapted to generate (set) a Y flag S702 when the value of the block count S701 is 4 or smaller to indicate that a luminance Y block is being supplied. The generator 702 is also adapted to set a Cb flag S703 when the value of the block count S701 is equal to 5, to indicate that the chrominance Cb block is being supplied. The generator 702 is further adapted to set a Cr flag S704 when the value of the block count S701 is equal to 6, to indicate that the chrominance Cr block is being supplied. The generator 702 supplies the signals S702, S703, S704 to a variable length encoding table modifier 706.

The motion compensation mode signal S14 is supplied to an input terminal 721 which applies it to an intra flag generator 709.

The intra flag generator 709 functions to set an intra flag S705, to a value of, for example 1, when the motion compensation mode signal S14 indicates the intra picture-encoding (intra picture-prediction) mode. The generator 709 supplies the intra flag S705 to switch 710 at the logic value 0 when the signal S14 does not indicate intra picture encoding, that is, indicates forward, backward or bidirectional encoding.

The switch 710 serves to select a pole A or B when the intra flag S705 has the logic value 0 or 1, respectively, so that when non-intra picture encoding is indicated, the differentiated coefficient signal S24 is supplied as a signal S706 to a two-dimensional variable length encoder 704, and when intra picture encoding is indicated, the differentiated coefficient signal S24 is supplied to a DC/AC coefficient separator 703.

The two-dimensional variable-length coder 704 is adapted to encode the differentiated DCT coefficients S706 using a variable length code such as the well known two-dimensional Huffman code to produce a VLC code signal S709, and to output the signal S709 to a DC/AC coefficient multiplexer 708.

The DC/AC coefficient separator 703 functions to split the differentiated DCT coefficients S24 into AC coefficients S707 which are supplied to the two-dimensional variable length encoder 704, and into DC coefficients S708 which are supplied to a DC coefficient variable length encoder 705.

The two-dimensional variable-length coder 704 also serves to encode the AC coefficients, and to output encoded AC coefficients as part of the VLC code signal S709.

The DC coefficient variable length coder 705 is operable to encode the DC coefficients S708, for example, in accordance with the computer program shown in FIG. 8, and to supply the encoded DC coefficients as a signal S710 to the DC/AC coefficient multiplexer 708.

A variable length encoding table storage 707 serves to store the tables used by the coder 705. These tables may be as shown in FIGS. 9A–9C.

More specifically, the variable length encoder 705 uses a DC coefficient in the DC coefficient signal S708 to search the table shown in FIG. 9A for a size, that is, number of bits, and a code corresponding to the differential DC coefficient. The size found from the table is, in turn, used to search the table shown in either FIG. 9B or 9C for a corresponding variable length code. The code found from the table shown in FIG. 9A is concatenated with the VLC code found from the table shown in one of FIGS. 9B and 9C to produce a VLC-code signal S710 for the DC coefficient which is output to the DC/AC coefficient multiplexer 708.

The intra_dc_precision signal S26 is supplied to an input terminal 723 which applies it to a variable length encoding table modifier 706.

The variable-length encoding table modifier 706 functions to control the storage 707, based on the intra_dc_precision code S26, to supply only a required portion of the table shown in FIG. 9A to the variable length encoder 705. Specifically, when the intra_dc_precision code S26 has the value '00', '01', '10', '11', the modifier 706 controls the storage 707 to output only the portion of the table shown in FIG. 9A corresponding to the size values 0–8, 0–9, 0–10, 0–11 bits, respectively.

The modifier 706 can also control the storage 707 to supply the entire table shown in FIG. 9A to the variable length encoder 705 irrespective of the value of the intra_dc_precision code S26. However, this may cause supplying of unnecessary portions of the table to the variable-length encoder 705, which may increase the encoding time. Thus, it is desirable to output only the required portion of the table shown in FIG. 9A.

The modifier 706 also functions to control the storage 707 to supply the table shown in FIG. 9B to the encoder 705 when the Y flag S702 is set, indicating that the DC coefficients S708 correspond to a luminance block. The modifier 706 further functions to control the storage 707 to supply the table shown in FIG. 9C to the encoder 705 when either the Cb flag S703 or the Cr flag S704 is set, indicating that the DC coefficients S708 correspond to a chrominance block. Thus, the storage 707 outputs only the required one of the tables shown in FIGS. 9B and 9C to the encoder 705.

The DC/AC coefficient multiplexer 708 functions to multiplex the signal 709, representing the VLC encoded non-intra picture coefficients and the VLC encoded intra picture AC coefficients, with the signal 710, representing the VLC encoded intra picture DC coefficients, to produce an output signal, and to supply this output signal to an output terminal 732 and thence to the buffer-memory unit 127 shown in FIG. 13.

As explained above with respect to FIG. 13, setting of one of the video sequence start flag S20, the GOP start flag S21, the picture start flag S22, and the slice start flag S23 prompts the VLC encoder 126 to generate a start code for a video sequence, GOP, picture and slice, respectively. The multiplexer 708 also multiplexes the start codes, the control information signal S25 used in the header, and the motion vector signal S13, the quantization step width signal S18 and macroblock address signal S27, as appropriately encoded, and supplies this multiplexed information to the output terminal 732.

A decoding apparatus according to the present invention will now be described in more detail with reference to FIGS. 18–20.

Figure 18:
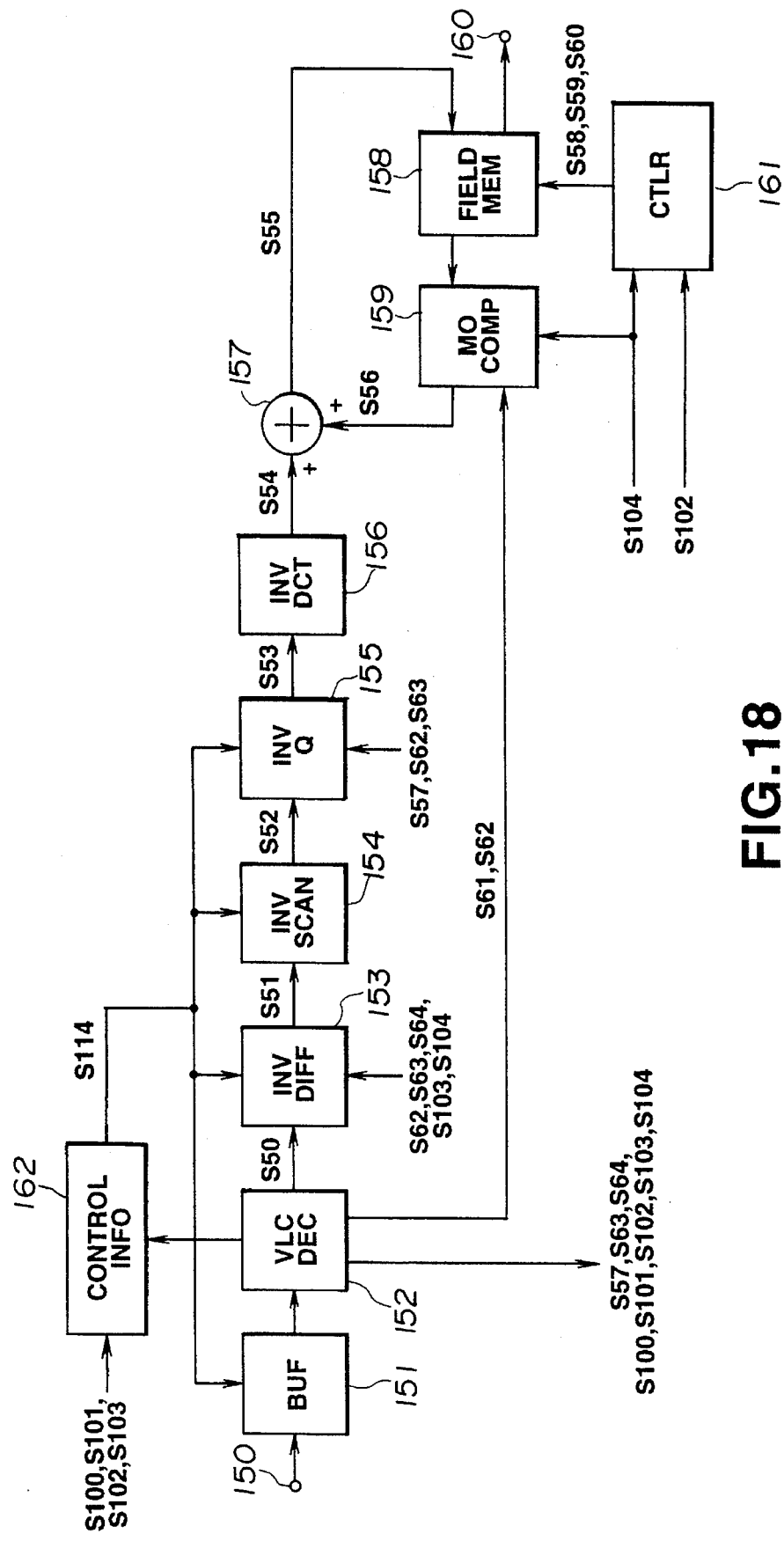
FIG. 18 is a block diagram showing an embodiment of a motion video picture decoding apparatus in accordance with the present invention.

FIG. 18 shows a decoding apparatus according to the present invention, and includes input terminal 150, buffer 151, VLC decoder 152, inverse differentiator 153, inverse scan converter 154, inverse quantizer 155, inverse DCT circuit 156, adder 157, field memories 158, motion compensator 159, output terminal 160, field memory controller 161 and control information storage 162.

A bit stream encoded by, for example, the encoding apparatus shown in FIG. 13 is supplied to an input terminal 150 which applies it to a buffer 151 that functions to store the encoded bit stream and then supply it to a VLC decoder 152.

As explained with reference to FIG. 2, the bit stream comprises six layers: video sequence, GOP, picture, slice, macroblock (MB) and block. The encoded bit stream includes a start code at the beginning of each layer portion, followed by appropriate header information.

The encoding apparatus of FIG. 13 outputs a bit stream in which the encoding precision of DCT DC component coefficients can be switched from one precision (number of quantization bits) to another in video sequence, GOP, picture or slice units in accordance with the demanded picture quality. Accordingly, the decoding apparatus shown in FIG. 18 receives decoding precisions expressed in terms of quantization bits in video sequence, GOP, picture or slice units so that the technique of decoding direct-current component coefficients can be changed adaptively.

In more detail, a two-bit intra_dc_precision code, expressed in quantization bits, is included in a sequence, GOP, picture or slice header as information regarding the decoding precision of DC coefficients. The header is output by the encoding apparatus as part of the bit stream. The VLC decoder 152 shown in FIG. 15 receives the sequence, GOP, picture or slice header, and decodes the intra_dc_precision code included therein as a signal S63 to obtain the decoding precision to be used for DCT DC coefficients. The VLC decoder 152 supplies the intra_code_precision code S63 to an inverse differentiator 153 and an inverse quantizer 155.

The VLC decoder 152 is operable to detect a start code indicating the beginning of a video sequence in the bit stream, to set a sequence-start flag S100, and then to decode the variable length encoded sequence header information. The decoder 152 is further operable to detect a start code indicating the beginning of a GOP, a picture or a slice in the bit stream, to set a GOP-start flag S101, a picture-start flag S102 or a slice-start flag S103, and to decode the header information for the GOP, the picture or the slice, respectively, using a variable length decoding technique. The decoder 152 supplies the decoded header information to a control information storage 162.

The control information storage 162 serves to supply the control information stored therein as a control-information signal S114 to a variety of blocks in the motion video picture decoding apparatus.

The VLC decoder 152 is also operable to detect the beginning of a macroblock in the bit stream and to set a MB-start flag S104 at each such detection. The decoder 152 decodes the MB header information to obtain a MB address indicating a location of the MB in the picture being decoded. The VLC decoder 152 is additionally operable to decode the encoded picture data in the bit stream to produce an output signal S50, a quantization step (or, strictly speaking, inverse quantization step) signal S57, a motion vector signal S61 and motion compensation mode signal S62. The decoder 152 supplies the signal S50 to the inverse differentiator 153. The VLC decoder 152 is explained in detail below with reference to FIG. 19.

The inverse differentiator 153 is adapted to operate in a manner complementary to the differentiator 125 of FIG. 13 to produce a quantized DCT coefficient signal S51 and to supply the signal S51 to an inverse scan converter 154. The inverse differentiator 153 is explained in detail below with reference to FIG. 20.

The inverse scan converter 154 is adapted to scan the quantized DCT coefficients S51 in a zigzag-scan manner in an order from a lowest-frequency coefficient to a highest-frequency coefficient to produce a signal S52, and to output the signal S52 to the inverse quantizer 155.

The inverse quantizer 155 is adapted to receive the inverse-quantization step signal S57 and to carry out inverse quantization on the signal S52 to produce a block DCT coefficient signal S53, and to supply the signal S53 to an inverse DCT circuit 156. The inverse quantizer 155 has the same construction as the inverse quantizer 118, shown in detail in FIG. 15.

The inverse DCT circuit 156 functions to perform an inverse DCT transformation on the coefficients in the signal S53 to produce a signal S54, and to supply the signal S54 to an adder 157.

The motion compensator 159 functions in a similar manner as the motion compensator 122 shown in FIG. 13. The motion compensator 159 produces a predicted picture S56 from an already decoded picture stored in field memories 158, and supplies the predicted picture S56 to the adder 157.

More specifically, in the forward, backward or bidirectional prediction mode, the motion compensator 159 shifts the read address of the field memories 158, from a position which corresponds to a location of a block of difference data S54 being output to the adder 157, by a displacement corresponding to the motion vector S61. The motion compensator 159 then reads out picture data at the shifted read address and supplies it to the adder 157 as the predicted picture S56. Motion compensation is typically carried out in block units each comprising 16×16 pixels.

In the intra picture prediction mode, the motion compensator does not supply a predicted picture S56 to the adder 157 because the signal S54 represents standalone picture data, that is, picture data which was not predictively encoded relative to another picture.

The adder 157 serves to predictively decoded the data supplied thereto by adding the difference signal S54 to the predicted picture S56 on a pixel-by-pixel basis to produce decoded picture data S55, and to supply the picture data S55 to the field memories 158.

The field memories 158 serve to store the decoded picture data S55 at addresses specified by a picture command signal S59, to output the stored picture data to the motion compensator 159 in accordance with a motion compensating reference picture command signal S58 for use in generating a predicted picture which will, in turn, be used for decoding a picture encoded with forward, backward or bidirectional predictive encoding. The memories 158 also serve to output the stored picture data to a terminal 160 as a playback picture at a timing determined by an output picture command signal S60. Only data for I and P pictures is stored in the field memories 158, that is, data for a B picture is not stored therein. This is because data for a B picture is not used in the forward, backward and bidirectional predictive decoding.

The field memory controller 161 functions in the same manner as the field memory unit controller 124 shown in FIG. 13. The controller 161 generates the motion compensating reference picture command signal S58, the picture command signal S59 and the output picture command signal S60 in synchronism with the picture-start flag S102.

Figure 19:
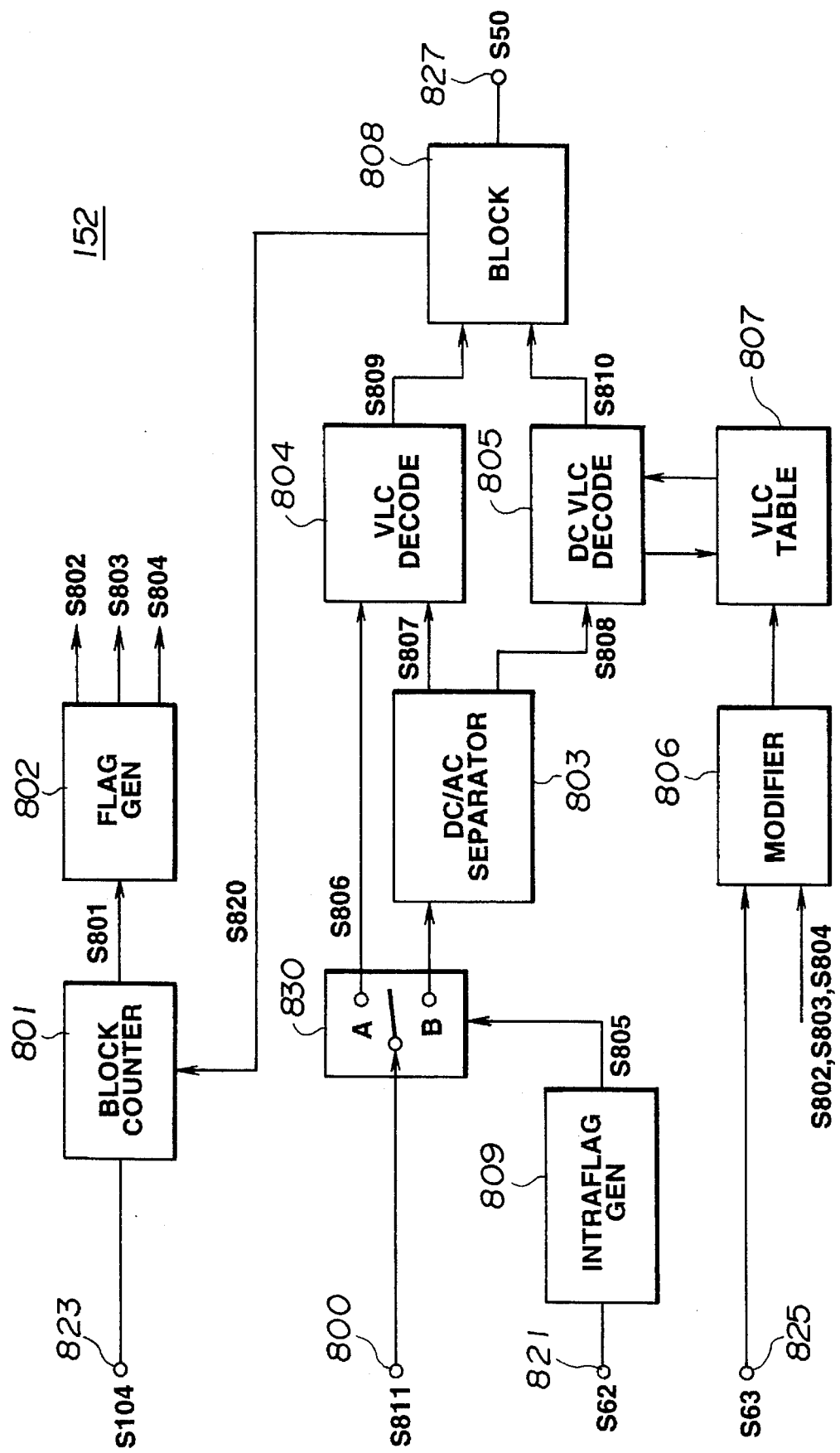
FIG. 19 is a detailed block diagram of a VLC decoder 152 shown in FIG. 18.

FIG. 19 shows a detailed embodiment of the VLC decoder 152.

The VLC decoder 152 is seen to include input terminals 800, 821, 823, 825, block counter 801, flag generator 802, DC/AC coefficient separator 803, VLC decoder 804, DC VLC decoder 805, VLC table modifier 806, VLC table storage 807, blocking circuit 808, intra flag generator 809, output terminal 827 and switch 830.

In a processing circuit not shown in FIG. 19, a portion corresponding to the picture data is extracted from the bit stream supplied from the buffer 151. The extracted portion is then supplied as a signal S811 to an input terminal 800 which applies it to a switch 830.

The motion compensation mode signal S62 is supplied to an input terminal 821 which applies it to an intra flag generator 809.

The intra flag generator 809 functions to set an intra flag S805, to a value of, for example 1, when the motion compensation mode signal S62 indicates the intra picture-encoding (intra picture-prediction) mode. The generator 809 supplies the intra flag S805 to switch 830 at the logic value 0 when the signal S62 does not indicate intra picture encoding, that is, indicates forward, backward or bidirectional encoding.

The switch 830 serves to select a pole A or B when the intra flag S805 has the logic value 0 or 1, respectively, so that when non-intra picture encoding is indicated, the extracted portion of the encoded picture data S811 is supplied as a signal S806 to a two-dimensional VLC decoder 804, and when intra picture encoding is indicated, the signal S811 is supplied to a DC/AC coefficient separator 803.

The two-dimensional VLC decoder 804 is adapted to decode the encoded coefficients S811 using a variable length code such as the well known two-dimensional Huffman code to produce a signal S809, and to output the signal S809 to a blocking circuit 808.

The DC/AC coefficient separator 803 functions to split the signal S811 into AC coefficients S807 which are supplied to the two-dimensional VLC decoder 804, and into DC coefficients S808 which are supplied to a DC coefficient VLC decoder 805.

The decoder 804 also serves to decode the encoded AC coefficients, and to output decoded AC coefficients as part of the signal S809.

The DC coefficient VLC decoder 805 is operable to decode the DC coefficients S808, for example, in accordance with the computer program shown in FIG. 12, and to supply the decoded DC coefficients as a signal S810 to the blocking circuit 808.

A VLC table storage 807 serves to store the tables used by the decoder 805. These tables may be as shown in FIGS. 9A–9C.

More specifically, the decoder 805 uses a DC coefficient in the DC coefficient signal S808 to search the appropriate table shown in FIGS. 9B or 9C for a size, that is, number of bits. The size found from the table is, in turn, used to search the table shown in FIG. 9A for a corresponding decoded DC coefficient. The decoded DC coefficient found from the table shown in FIG. 9A is output to the blocking circuit 808.

The blocking circuit 808 functions to receive coefficients from the decoders 804, 805, to block these coefficients into a block of 8×8 coefficients, and to supply these coefficients to an output terminal 827 as the signal S50 for application to the inverse differentiator 152 of FIG. 18.

The blocking circuit 808 also functions to set a flag S820 each time it outputs a block to the output terminal 827.

The MB-start flag S104 is supplied to an input terminal 823 which applies it to a block counter 801.

The block counter 801 is adapted to receive the flag S820, to count the number of times the flag S820 is set to produce a block count signal S801, and to supply the block count S801 to a flag generator 802. When the MB-start flag S104 is set, the block counter 801 is reset to an initial value of unity.

The flag generator 802 is adapted to generate (set) a Y flag S802 when the value of the block count S801 is 4 or smaller to indicate that a luminance Y block is being supplied. The generator 802 is also adapted to set a Cb flag S803 when the value of the block count S801 is equal to 5, to indicate that the chrominance Cb block is being supplied. The generator 802 is further adapted to set a Cr flag S804 when the value of the block count S801 is equal to 6, to indicate that the chrominance Cr block is being supplied. The generator 802 supplies the signals S802, S803, S804 to a VLC table modifier 806.

The intra_dc_precision code S63 is supplied to an input terminal 825 which applies it to the VLC table modifier 806.

The VLC table modifier 806 functions to control the storage 807, based on the intra_dc_precision code S63, to supply only a required portion of the table shown in FIG. 9A to the decoder 805. Specifically, when the intra_dc_precision code S63 has the value '00', '01', '10', '11', the modifier 806 controls the storage 807 to output only the portion of the table shown in FIG. 9A corresponding to the size values 0–8, 0–9, 0–10, 0–11 bits, respectively.

The modifier 806 can also control the storage 807 to supply the entire table shown in FIG. 9A to the decoder 805 irrespective of the value of the intra_dc_precision code S63. However, this may cause supplying of unnecessary portions of the table to the decoder 805, which may increase the encoding time. Thus, it is desirable to output only the required portion of the table shown in FIG. 9A.

The modifier 806 also functions to control the storage 807 to supply the table shown in FIG. 9B to the decoder 805 when the Y flag S802 is set, indicating that the DC coefficients S808 correspond to a luminance block. The modifier 806 further functions to control the storage 807 to supply the table shown in FIG. 9C to the decoder 805 when either the Cb flag S803 or the Cr flag S804 is set, indicating that the DC coefficients S808 correspond to a chrominance block. Thus, the storage 807 outputs only the required one of the tables shown in FIGS. 9B and 9C to the encoder 805.

Figure 20:
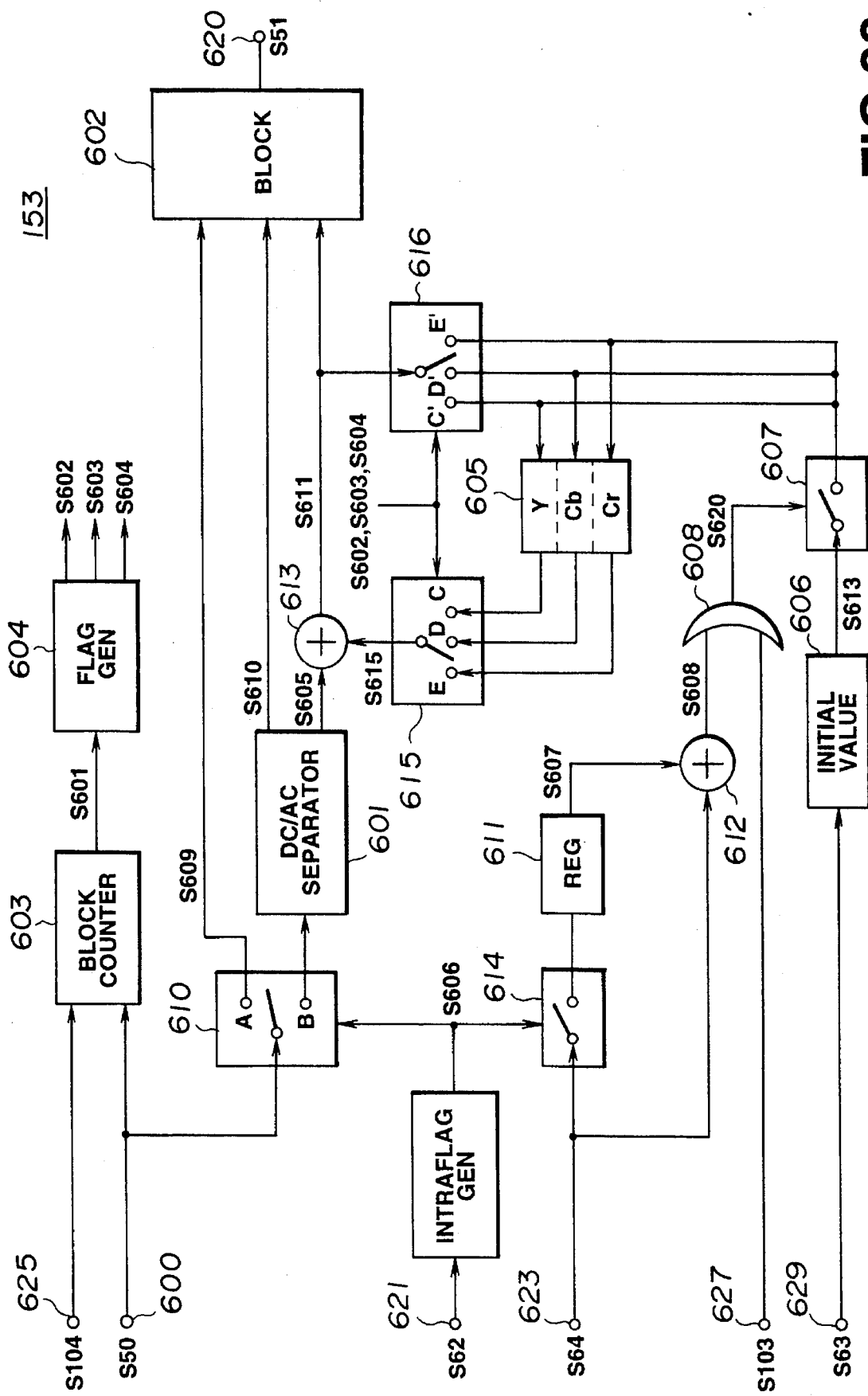
FIG. 20 is a detailed block diagram of a DC coefficient inverse differentiator 153 shown in FIG. 18.

FIG. 20 shows a detailed embodiment of the inverse differentiator 153.

The inverse differentiator 153 is seen to include input terminals 600, 621, 623, 625, 627, 629, DC/AC coefficient separator 601, blocking circuit 602, block counter 603, flag generator 604, registers 605, 611, initial value generator 606, switches 607, 610, 614, 615, 616, OR gate 608, intra flag generator 609, subtractor 612, adder 613 and output terminal 620.

The quantized DCT coefficients S50 output by the inverse-VLC unit 152 are supplied to an input terminal 600, which applies the signal S50 to a block counter 603 and a switch 610.

The MB-start flag S104 is supplied to an input terminal 625 which applies it to the block counter 603.

The block counter 603 functions to count the number of blocks in each macroblock of the signal S50 to produce a block count signal S601 and to supply the signal S601 to the flag generator 604. Specifically, the block count S601 has a value of 1, 2, 3, 4, 5, 6 as the respective blocks Y0, Y1, Y2, Y3, Cb, Cr in each macroblock are supplied. When the macroblock start flag S104 is set, the block counter 603 is reset.

The flag generator 604 is adapted to generate (set) a Y flag S602 when the value of the block count S601 is 4 or smaller to indicate that a luminance Y block is being supplied. The generator 604 is also adapted to set a Cb flag S603 when the value of the block count S601 is equal to 5, to indicate that the chrominance Cb block is being supplied. The generator 604 is further adapted to set a Cr flag S604 when the value of the block count S601 is equal to 6, to indicate that the chrominance Cr block is being supplied. The generator 604 supplies the signals S602, S603, S604 to switches 615, 616.

The motion compensation mode signal S62 is supplied to an input terminal 621 which applies it to an intra flag generator 609.

The intra flag generator 609 functions to set an intra flag S606, to a value of, for example 1, when the motion compensation mode signal S62 indicates the intra picture-encoding (intra picture-prediction) mode. The generator 609 supplies the intra flag S606 at the logic value 0 when the signal S62 does not indicate intra picture encoding, that is, indicates forward, backward or bidirectional encoding. The intra flag S606 is supplied to switches 610 and 614.

The switch 610 serves to select a pole A or B when the intra flag S606 has the logic value 0 or 1, respectively, so that when non-intra picture encoding is indicated, the coefficient signal S50 is supplied as a signal S609 to a blocking circuit 602, and when intra picture encoding is indicated, the coefficient signal S50 is supplied to the DC/AC coefficient separator 601.

The blocking circuit 602 is adapted to block the coefficients S609 into an 8×8 block of coefficients, and to supply the blocked coefficients to a terminal 620 for application to the inverse scan converter 154 shown in FIG. 18 as the signal S51.

The DC/AC coefficient separator 601 is adapted to split the coefficient signal S50 into AC coefficients S610 which are supplied to the blocking circuit 602, and into DC coefficients S605 which are supplied to an adder 613.

The adder 613 serves to receive a delayed signal S615 and the quantized DC coefficients S605 and to add the signals S605, S615 to produce a signal S611 representing the original DC coefficients. The four chrominance blocks Y0 to Y3 and the two chrominance blocks Cb and Cr undergo inverse differentiation processes independently. The adder 613 supplies the signal S611 to the blocking circuit 602 and a switch 616.

The adder 613, switches 615, 616 and registers 605 function to perform inverse differentiation of received coefficients, as was described with reference to FIGS. 5A and 5B.

More specifically, when the flag generator 604 sets the Y flag S602 and resets the Cb and Cr flags S603 and S604, indicating that the DC coefficients S605 are from a luminance block, the switches 615 and 616 select poles C and C' respectively, to supply the DC coefficients S611 to a Y register of the registers 405. The Y register 405 delays the luminance coefficients by a time corresponding to one block, then supplies these coefficients to a pole C of the switch 615, which applies the coefficients as the delayed signal S615 to the adder 613.

When the flag generator 604 sets the Cb flag S603 and resets the Y and Cr flags S602, S604, indicating that the DC coefficients S605 are from a chrominance Cb block, the switches 615 and 616 select poles D and D' respectively, to supply the DC coefficients S611 to a Cb register of the registers 605. The Cb register 605 delays the chrominance Cb coefficients by a time corresponding to one macroblock, then supplies these coefficients to a pole D of the switch 615, which applies the coefficients as a delayed signal to the adder 613.

When the flag generator 604 sets the Cr flag S604 and resets the Y and Cb flags S602 and S603, indicating that the DC coefficients S605 are from a chrominance Cr block, the switches 615 and 616 select poles E and E' respectively. The chrominance Cr coefficients are delayed for one macroblock of time, then are applied to the adder 613.

The blocking circuit 602 also blocks the DC coefficients S611 of a block with AC coefficients S610 from the DC/AC coefficient separator 601, and supplies the result as the signal S51 to the inverse-scan converter 154 shown in FIG. 18.

When the MB address signal S64 for the macroblocks being decoded does not convey contiguous values or the DC coefficients belong to a first macroblock of a slice, the Y, Cb and Cr registers 605 are reset to an initial value S613 by a register initial value generator 606.

The intra_dc_precision code S63, which represents the encoding precision for DC coefficients, is supplied to an input terminal 629 that applies it to the register initial value generator 606.

The register initial value generator 606 is operable to generate the initial value S613 for the Y, Cb and Cr registers 405 in accordance with the intra_dc_precision code S63 as shown in the table presented above with respect to the register initial value generator 406 shown in FIG. 16.

The switch 607 is put into an OFF or ON state when a control signal S620 has a value of, for example, zero or one, respectively. When the switch 607 switches into the ON state, the initial value S613 is applied to each of the registers 605. The control signal S620 puts the switch 607 into the ON state when the MB address signal S64 of the MBs experiencing the intra picture decoding process does not convey contiguous values or the DC coefficients belong to a first macroblock of a slice.

The control signal S620 may be produced as follows.

The macroblock address signal S64 is supplied to an input terminal 623 which applies it to the switch 614 and to a subtractor 612. The switch 614 functions to supply the MB address S64 to a register 611 when the intra flag S606 indicates intra picture encoding. The register 611 is operable to delay the MB address S64 by a time corresponding to one MB, and to supply the delayed signal S607 to a subtracter 612.

The subtractor 612 serves to subtract the signal S607 from the signal S64 to produce a signal S608=S64−S607, and to apply the signal S608, representing address differences between adjacent macroblocks, to an input of an OR gate 608.

The slice start flag S103 is supplied to an input terminal 627 which applies it to another input of the OR gate 608.

The OR gate 608 functions to output the logic value 1 when the difference signal S608 is greater than unity (S608>1) or the slice start flag S103 is set. The OR gate 608 functions to otherwise output the logic value 0.

The present invention can also be applied to a motion video picture signal to be encoded with an encoding precision of other than eight quantization bits.

When the range of the value of the DC component coefficients resulting from a DCT process on an input signal in an encoding apparatus is N bits, and an encoding precision of M bits, $1 \leq M \leq N$, is specified using the intra_dc_precision code, then the quantization step width used in the quantizer 115 of the encoding apparatus shown in FIG. 13 is set at $2^{N-M}$ and the initial value S413 shown in FIG. 16 is set at $2^M/2$. The VLC processing carried out by the VLC unit 126 of FIG. 13 is based on data from the tables shown in FIGS. 21A and 21B instead of FIGS. 9B and 9C. The data in the tables of FIGS. 21A, 21B does not have to be fixed. Instead, it may be variables that result in an optimum post-encoding compression factor. The values of the variables are determined from statistical observation of the input picture signal.

Decoding of a picture encoded using the technique described above now will now be explained.

A value $2^{N-M}$ is used as the inverse quantization step width in the inverse quantizer 155 of the decoding apparatus shown in FIG. 18. A value $2^M/2$ is used as an initial value S613 shown in FIG. 20 for the inverse differentiation process. The inverse VLC processing carried out by the VLC decoder 152 is based on data in the tables of FIGS. 21A, 21B instead of the FIGS. 9B, 9C.

A technique for manufacturing the optical disk referred to above will now be described with reference to FIGS. 22–23.

Figure 22:
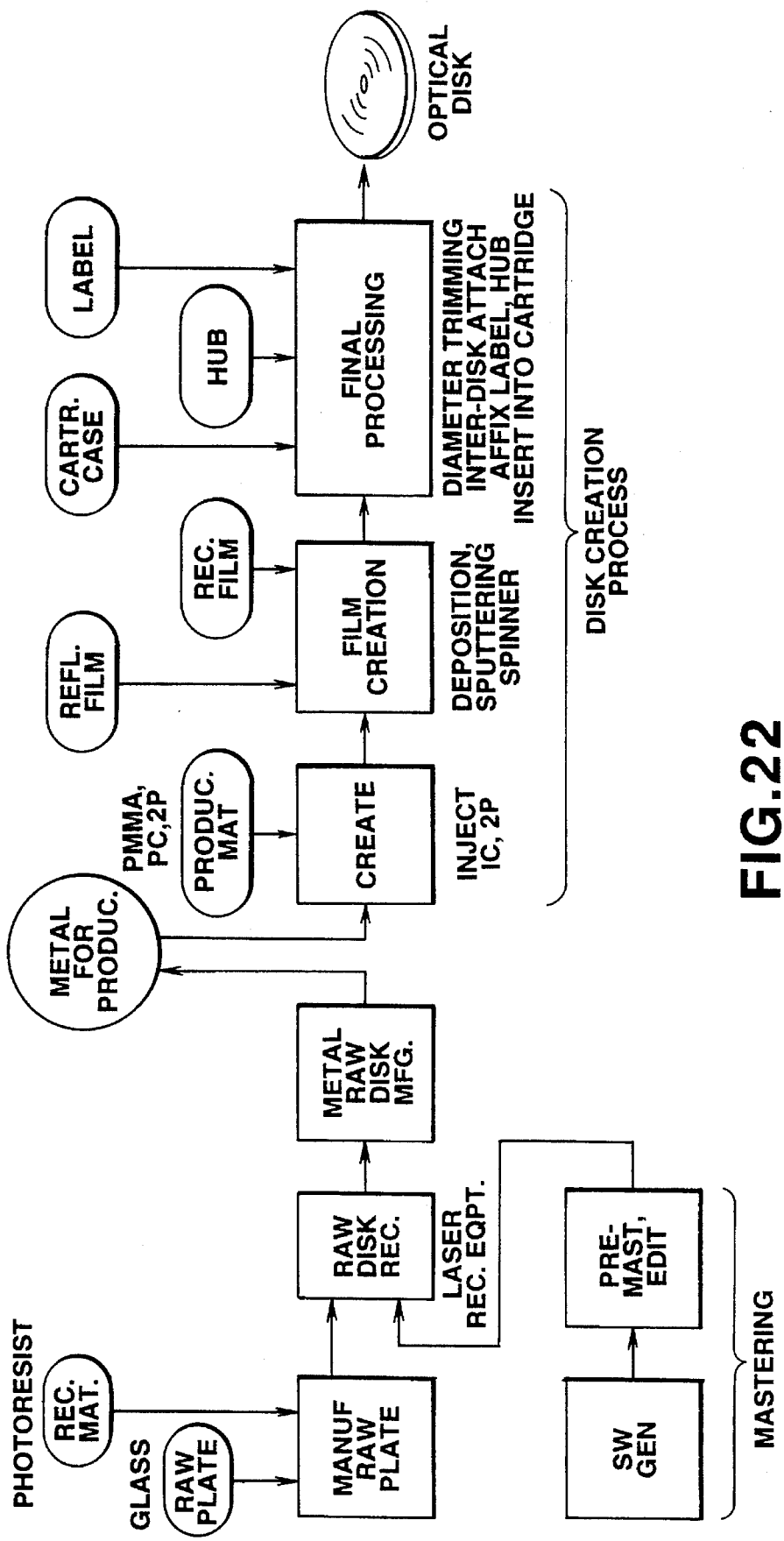
FIG. 22 is a diagram used for explaining a technique of manufacturing an optical disk for storing data encoded according to the present invention.
Figure 23:
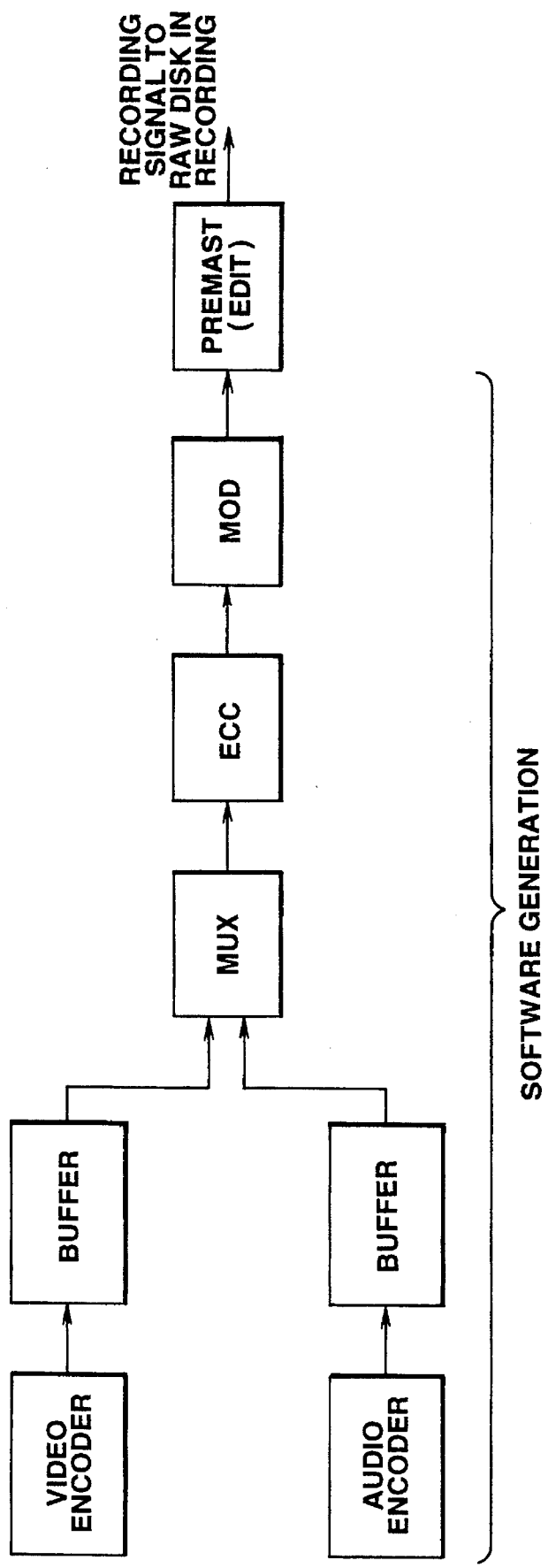
FIG. 23 is a diagram used for explaining a software generation portion of the manufacturing technique shown in FIG. 22.

As shown in FIG. 22, a raw disk made of glass or the like is prepared. The surface of the raw disk is then coated with a recording material made of, typically, a photoresist substance to produce a raw disk for recording.

As shown in FIG. 13, picture data (or video data) resulting from an encoding process performed by an encoding apparatus (or a video encoder) as described above is stored in a temporary buffer. At the same time, audio data resulting from an encoding process performed by an audio encoder is stored in another temporary buffer. The picture and audio data stored in the temporary buffers are multiplexed with a synchronization signal by a multiplexer MUX. Error-correction codes are then added to the output of the multiplexer MUX by an error-correction circuit ECC. Subsequently, the output of the error-correction circuit ECC undergoes predetermined modulation in a modulator MOD. The modulated data output by the modulator MOD is finally stored in a certain format temporarily in a magnetic tape typically to produce the desired software.

If necessary, the software is edited during a premastering process to produce a formatted signal that can be recorded into an optical disk. As shown in FIG. 11, modulated in accordance with this formatted signal, which is also known also as a recording signal, a laser beam is then applied to the photoresist on the raw disk. In this way, the photoresist experiences an exposure process to record information conveyed by the recording signal thereon.

When the raw disk is developed, pits appear on the surface thereof. The raw disk processed in this way then undergoes, typically, an electroforming process and the like to transfer the pits from the glass raw disk to a raw disk made of a metal. A metallic stamper is further produced from the metallic raw disk to be used as a mold.

A material such as PMMA (acrylate) and PC (polycarbonate) is then poured into the mold through an injection process or the like and hardened therein. As an alternative, the metallic stamper can be coated with an ultraviolet-ray hardened resin referred to as 2P and then an ultraviolet ray is applied to the resin for hardening it. In this way, the pits are transferred from the metallic stamper to a replica, the resin hardened, by the ultraviolet ray.

Subsequently, a reflective film is created on the replica produced in the processes described so far by deposition, sputtering or the like. As an alternative, a spin-coating process can also be used to create such a reflective film.

The raw disk then undergoes a machining process to trim the raw disk to its inner and outer diameters or another necessary process, for example, to attach the raw disk to another raw disk. Further, a label and a hub are affixed thereon. Finally, the raw disk is put in a cartridge, completing the process of producing an optical disk.

In this embodiment, the generation of difference data based on a predicted picture and the DCT processing of data are carried out in field units. However, processing can be switched from field units to frame units in order to increase the post-encoding compression factor. By switching the unit of the processing, the generation of difference data based on a predicted picture and the DCT processing of data can then be performed in frame units.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of encoding a video signal having pixels represented by n bits, n being an integer, comprising the steps of:

receiving a picture quality signal;

selecting an encoding precision of n+m bits, m being a non-negative integer, in accordance with said picture quality signal;

orthogonally transforming said video signal to produce direct current component coefficients and alternating current component coefficients;

quantizing only said direct current component coefficients using the selected encoding precision;

obtaining a difference between a first of said quantized direct current component coefficients and an initial value set in accordance with said selected encoding precision; and variable length encoding the differentiated direct current component coefficients using variable length coding tables, each of said coding tables having a length that is a function of said selected encoding precision.

2. A method according to claim 1, wherein said picture quality signal corresponds to a portion of said video signal selected from a video sequence, group of pictures, picture, slice, macroblock and block.

3. A method according to claim 2, wherein said block has a size of 8 pixels×8 lines.

4. A method according to claim 1, wherein n has a value of eight and n+m has a value of eight to eleven.

5. A method according to claim 1, wherein the step of orthogonally transforming comprises performing a discrete cosine transformation.

6. A method according to claim 1, wherein said direct current component coefficients include luminance direct current component coefficients and chrominance direct current component coefficients.

7. A video recording medium having recorded thereon a video signal encoded according to the method of claim 1.

8. A video recording medium according to claim 7, wherein said video recording medium is an optical disk.

9. An encoded video signal produced by the method of claim 1.

10. An apparatus for encoding a video signal having pixels represented by n bits, n being an integer, comprising:

means for receiving a picture quality signal;

means for selecting an encoding precision of n+m bits, m being a non-negative integer, in accordance with said picture quality signal;

means for orthogonally transforming said video signal to produce direct current component coefficients and alternating current component coefficients;

means for quantizing only said direct current component coefficients using the selected encoding precision;

means for obtaining a difference between a first of said quantized direct current component coefficients and an initial value set in accordance with said selected encoding precision; and means for variable length encoding the differentiated direct current component coefficients using variable length coding tables, each of said coding tables having a length that is a function of said selected encoding precision.

11. An apparatus according to claim 10, wherein said picture quality signal corresponds to a portion of said video signal selected from a video sequence, group of pictures, picture, slice, macroblock and block.

12. An apparatus according to claim 11, wherein said block has a size of 8 pixels×8 lines.

13. An apparatus according to claim 10, wherein n has a value of eight and n+m has a value of eight to eleven.

14. An apparatus according to claim 10, wherein said means for orthgonally transforming comprises means for performing a discrete cosine transformation.

15. An apparatus according to claim 10, wherein said direct current component coefficients include luminance direct current component coefficients and chrominance direct current component coefficients.

16. A video recording medium having recorded thereon a video signal encoded by the apparatus of claim 10.

17. A video recording medium according to claim 16, wherein said video recording medium is an optical disk.

18. A method of decoding an encoded video signal corresponding to an original video signal having pixels represented by n bits, n being an integer, comprising the steps of:

receiving a picture quality signal;

selecting a decoding precision of n+m bits, m being a non-negative integer, in accordance with said picture quality signal;

extracting encoded direct current component coefficients from said encoded video signal;

variable length decoding only said encoded direct current component coefficients using variable length coding tables, each of said coding tables having a length that is a function of the selected decoding precision;

obtaining an inverse difference between a first of the variable length decoded direct current component coefficients and an initial value set in accordance with the selected decoding precision; and inverse quantizing the inverse differentiated direct current component coefficients using the selected decoding precision.

19. A method according to claim 18, wherein said picture quality signal corresponds to a portion of said video signal selected from a video sequence, group of pictures, picture, slice, macroblock and block.

20. A method according to claim 19, wherein said block has a size of 8 pixels×8 lines.

21. A method according to claim 18, wherein n has a value of eight and n+m has a value of eight to eleven.

22. A method according to claim 18, further comprising the step of inverse orthogonally transforming the inverse quantized direct current component coefficients.

23. A method according to claim 18, wherein said encoded direct current component coefficients include encoded luminance direct current component coefficients and encoded chrominance direct current component coefficients.

24. An apparatus for decoding an encoded video signal corresponding to an original video signal having pixels represented by n bits, n being an integer, comprising:

means for receiving a picture quality signal;

means for selecting a decoding precision of n+m bits, m being a non-negative integer, in accordance with said picture quality signal;

means for extracting encoded direct current component coefficients from said encoded video signal;

means for variable length decoding only said encoded direct current component coefficients using variable length coding tables, each of said coding tables having a length that is a function of the selected decoding precision;

means for obtaining an inverse difference between a first of the variable length decoded direct current component coefficients and an initial value set in accordance with the selected decoding precision; and means for inverse quantizing the inverse differentiated direct current component coefficients using the selected decoding precision.

25. An apparatus according to claim 24, wherein said picture quality signal corresponds to a portion of said video signal selected from a video sequence, group of pictures, picture, slice, macroblock and block.

26. An apparatus according to claim 25, wherein said block has a size of 8 pixels×8 lines.

27. An apparatus according to claim 24, wherein n has a value of eight and n+m has a value of eight to eleven.

28. An apparatus according to claim 24, further comprising the step of inverse discrete cosine transforming the inverse quantized direct current component coefficients.

29. An apparatus according to claim 24, wherein said encoded direct current component coefficients include encoded luminance direct current component coefficients and encoded chrominance direct current component coefficients.

* * * * *